(12) United States Patent
Moyes et al.

(10) Patent No.: US 11,193,351 B2
(45) Date of Patent: Dec. 7, 2021

(54) VALVE APPARATUS

(71) Applicant: Welleng Science and Technology Ltd, Banchory (GB)

(72) Inventors: Peter Barnes Moyes, Banchory (GB); Stefan Neil Lewis Stewart, Aberdeen (GB)

(73) Assignee: WELLENG SCIENCE AND TECHNOLOGY LTD., Aberdeenshire (GB)

(*) Notice: Subject to any disclaimer, the term of this patent is extended or adjusted under 35 U.S.C. 154(b) by 0 days.

(21) Appl. No.: 16/646,343

(22) PCT Filed: Sep. 13, 2018

(86) PCT No.: PCT/GB2018/052599
§ 371 (c)(1),
(2) Date: Mar. 11, 2020

(87) PCT Pub. No.: WO2019/053431
PCT Pub. Date: Mar. 21, 2019

(65) Prior Publication Data
US 2020/0270966 A1 Aug. 27, 2020

(30) Foreign Application Priority Data
Sep. 13, 2017 (GB) .................................. 1714738

(51) Int. Cl.
*E21B 34/08* (2006.01)
*E21B 34/10* (2006.01)
*F16K 39/06* (2006.01)

(52) U.S. Cl.
CPC ............ *E21B 34/08* (2013.01); *E21B 34/101* (2013.01); *F16K 39/06* (2013.01); *E21B 2200/04* (2020.05); *E21B 2200/06* (2020.05)

(58) Field of Classification Search
CPC ........ E21B 34/08; E21B 34/101; E21B 34/06; E21B 2200/04; E21B 2200/06
See application file for complete search history.

(56) References Cited

U.S. PATENT DOCUMENTS

| 3,799,204 A | 3/1974 | Watkins et al. |
| 4,103,744 A * | 8/1978 | Akkerman ............ E21B 34/101 166/324 |

(Continued)

FOREIGN PATENT DOCUMENTS

| GB | 1420485 A | 1/1976 |
| GB | 2149834 A | 6/1985 |

OTHER PUBLICATIONS

International Search Report PCT/ISA/210 for International Application No. PCT/GB2018/052599 dated Oct. 15, 2018.

(Continued)

*Primary Examiner* — David Carroll
(74) *Attorney, Agent, or Firm* — Harness, Dickey & Pierce, P.L.C.

(57) ABSTRACT

A valve apparatus, such as a downhole valve apparatus, includes a housing having a flow path therein and a valve member mounted within the housing and being operable between closed and open configurations to control flow along the flow path. An actuator assembly is moveable from a first position to a second position to sequentially perform first and second actuation functions, the first actuation function being associated with the operation of an auxiliary system, and the second actuation function opening the valve member from its closed configuration.

27 Claims, 13 Drawing Sheets

(56) References Cited

U.S. PATENT DOCUMENTS

| | | | |
|---|---|---|---|
| 4,140,153 A | 2/1979 | Deaton | |
| 4,149,698 A | 4/1979 | Deaton | |
| 4,197,879 A | 4/1980 | Young | |
| 4,293,038 A * | 10/1981 | Evans | E21B 23/006 |
| | | | 166/331 |
| 4,603,742 A | 8/1986 | Wong et al. | |
| 2018/0119824 A1* | 5/2018 | Napier | F16K 27/067 |
| 2018/0156003 A1* | 6/2018 | Hradecky | E21B 31/107 |

OTHER PUBLICATIONS

Written Opinion of the International Searching Authority PCT/ISA/237 for International Application No. PCT/GB2018/052599 dated Oct. 24, 2018.
Search Report for Intellectual Property Office Application No. GB1714738.0 dated Dec. 19, 2017.
International Preliminary Report on Patentability for PCT/GB2018/052599 dated Mar. 26, 2020.

\* cited by examiner

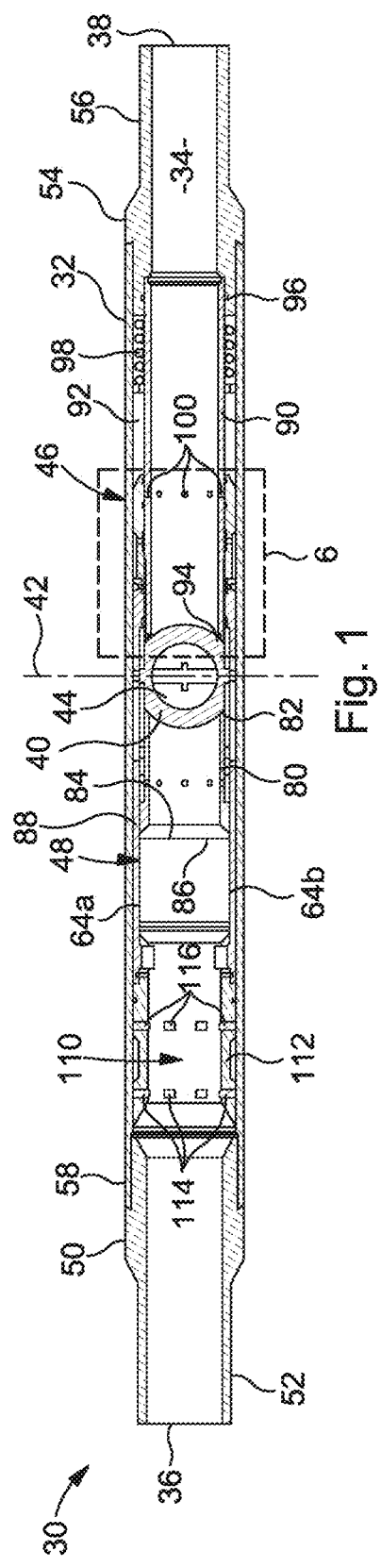

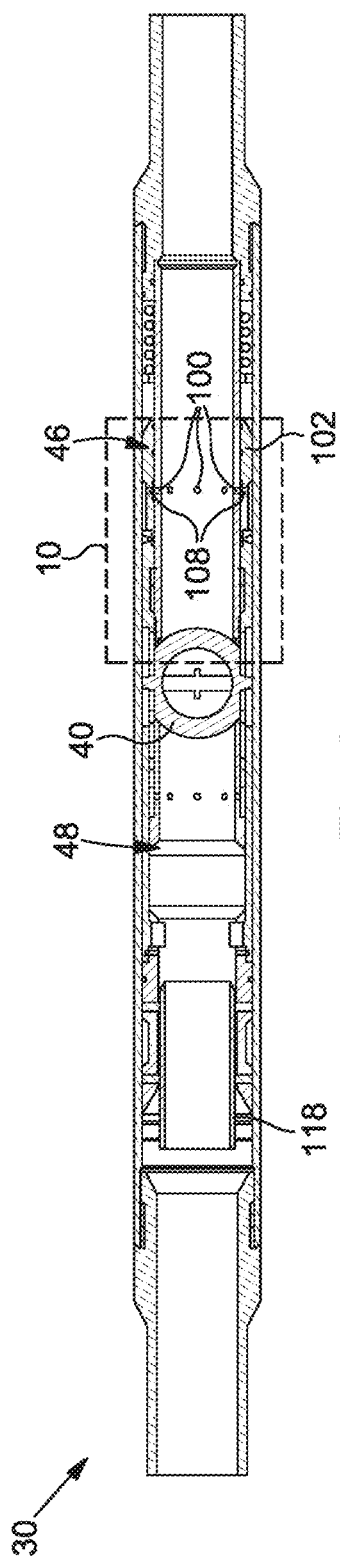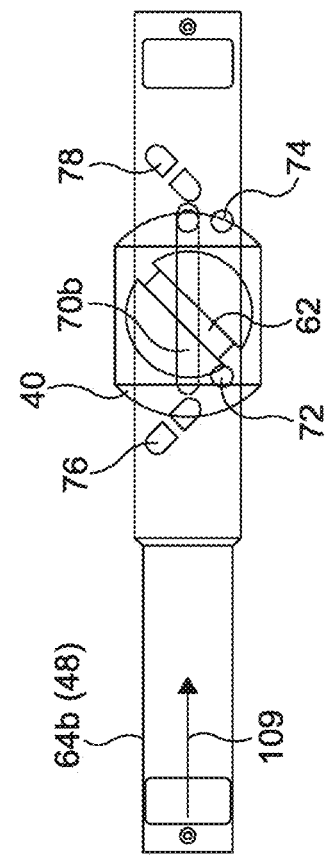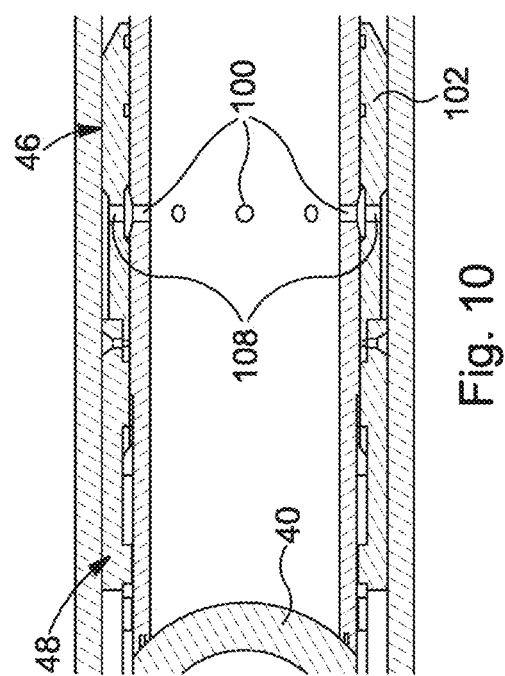

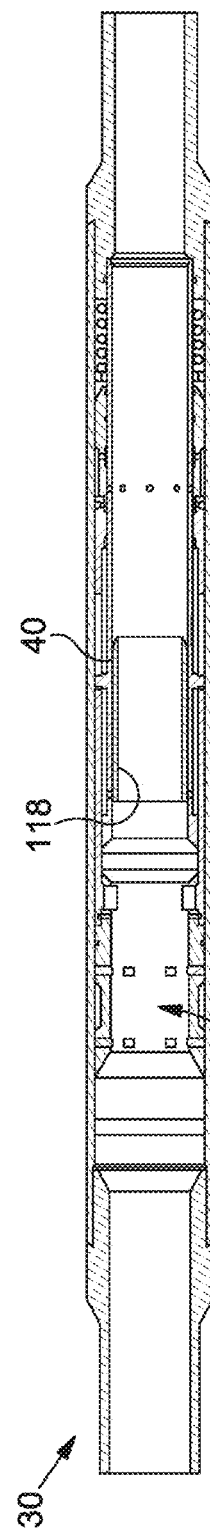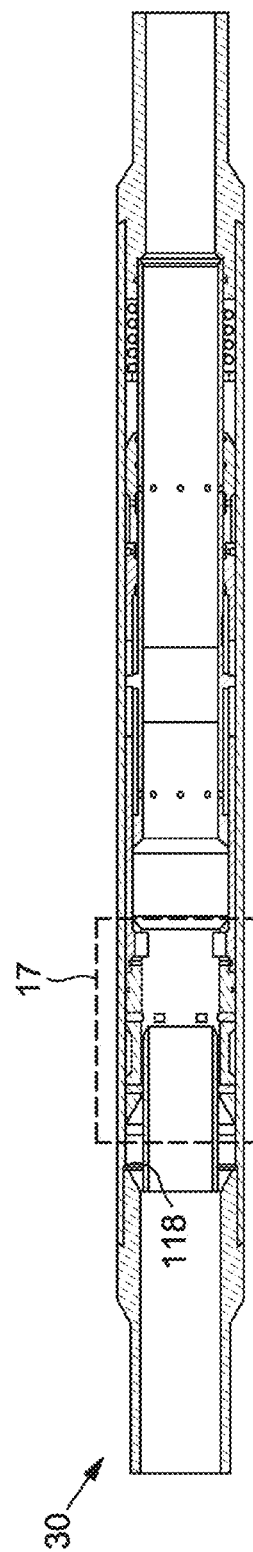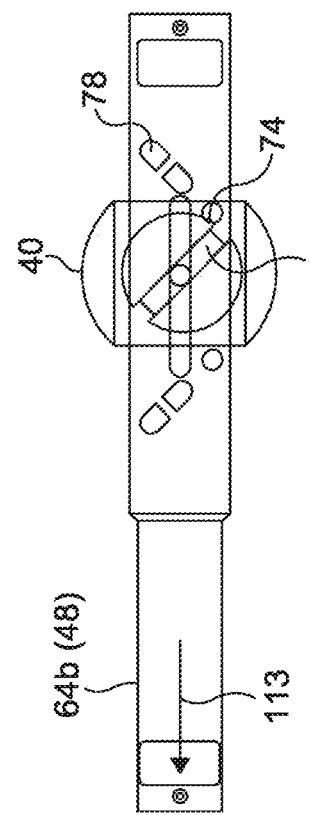

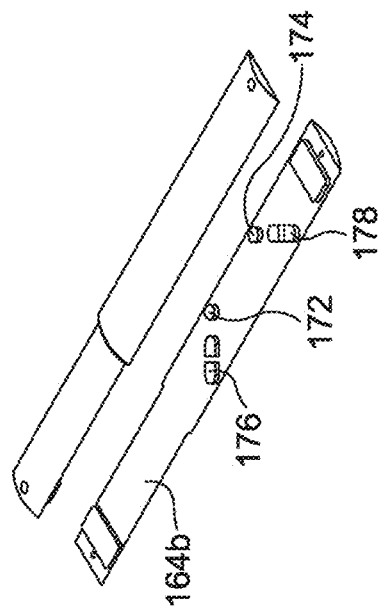
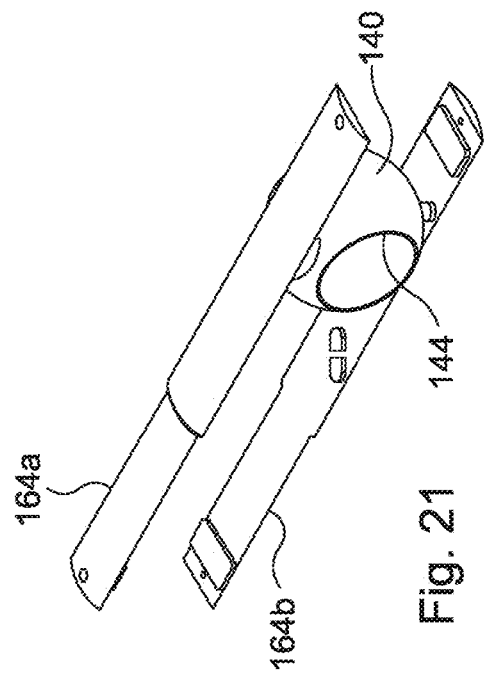
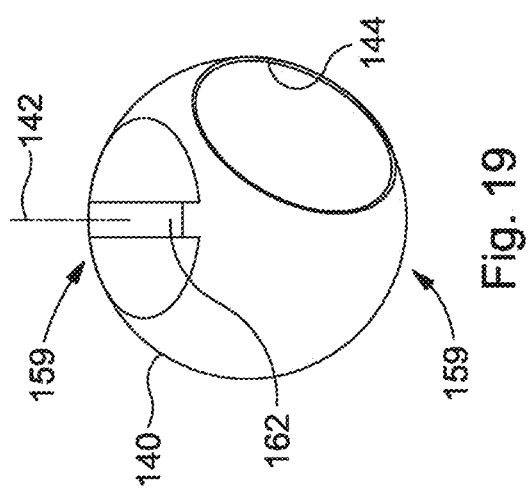

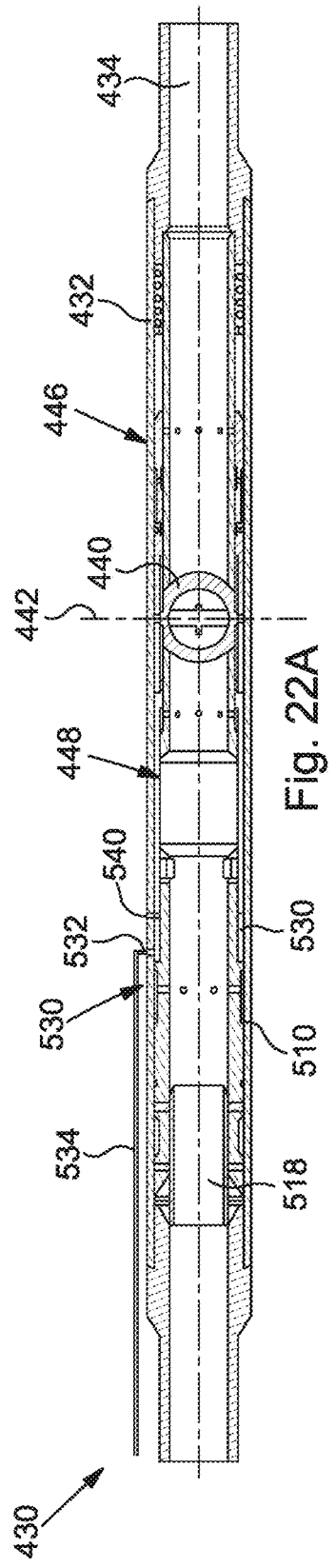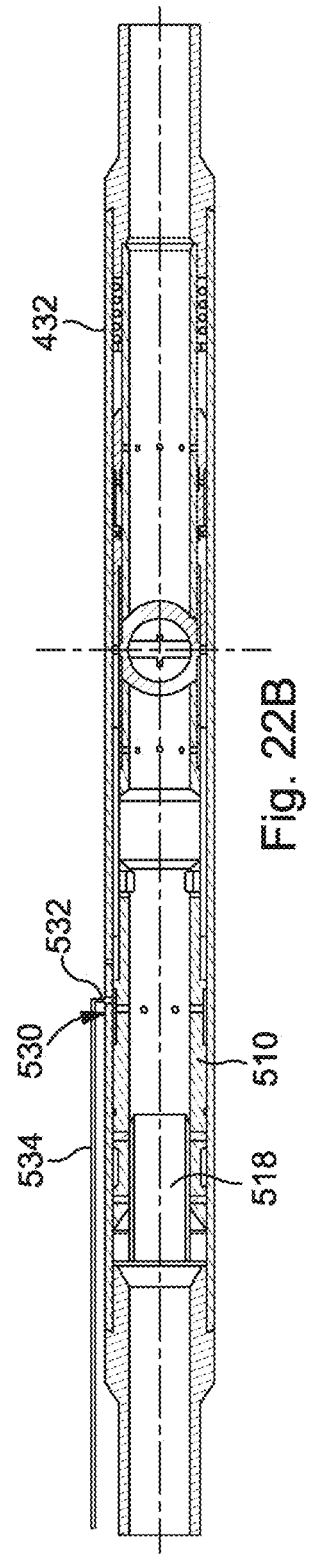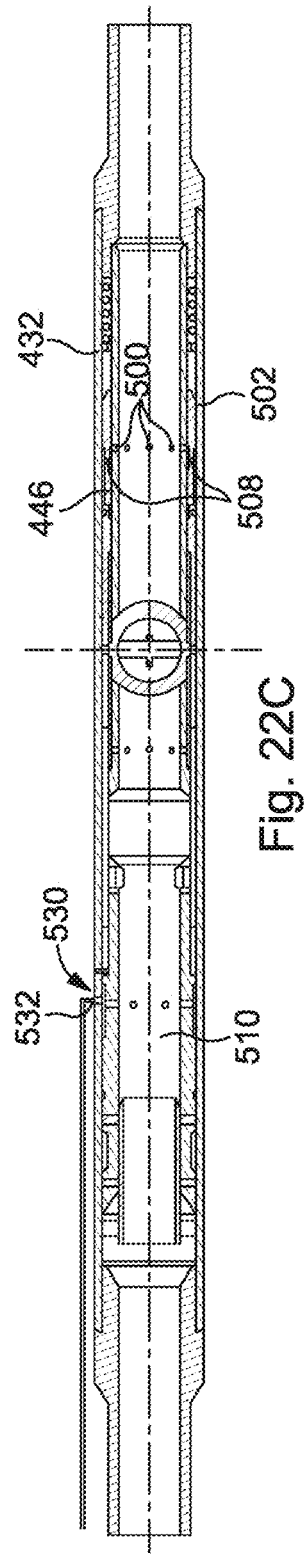

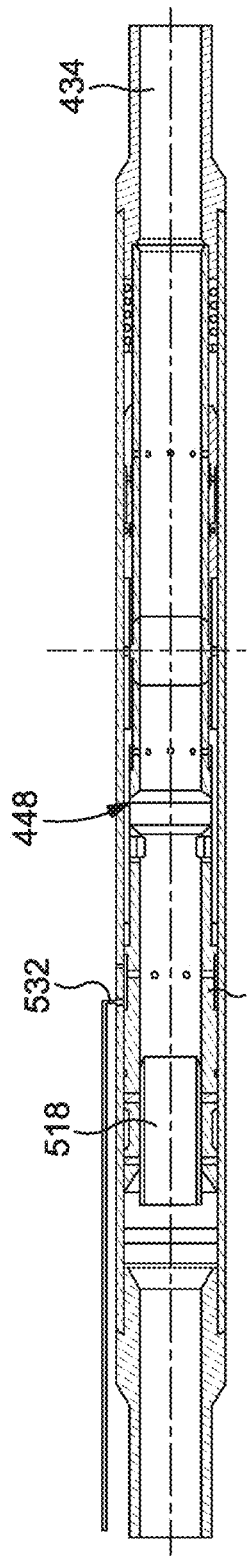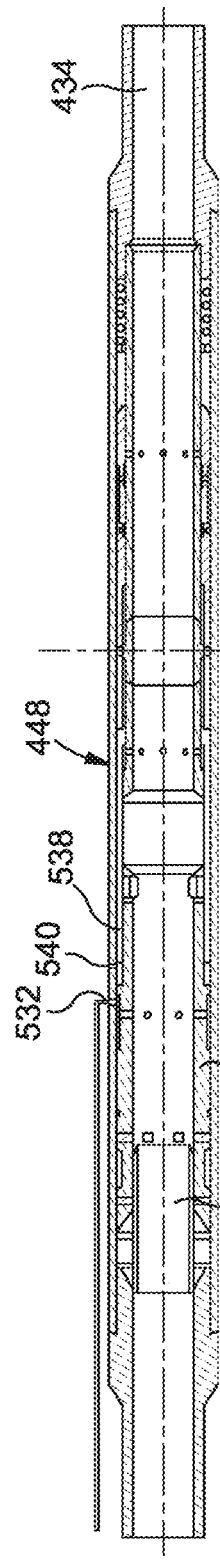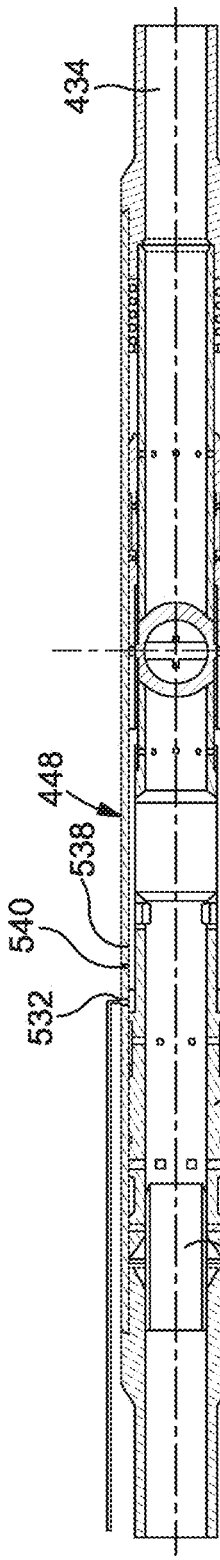

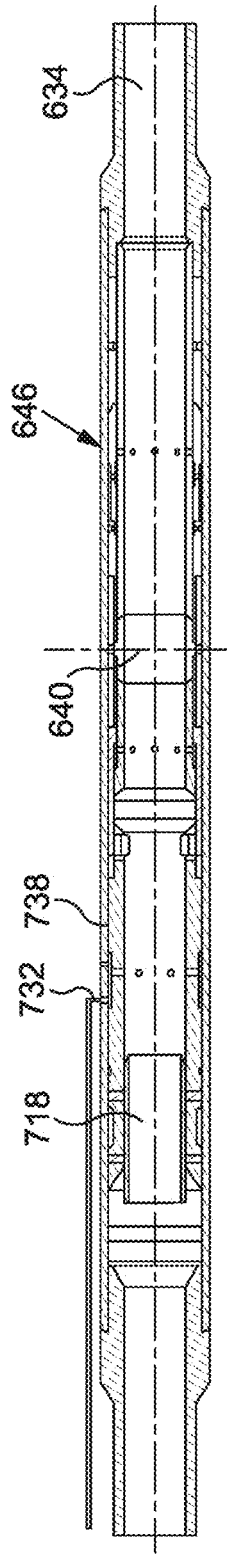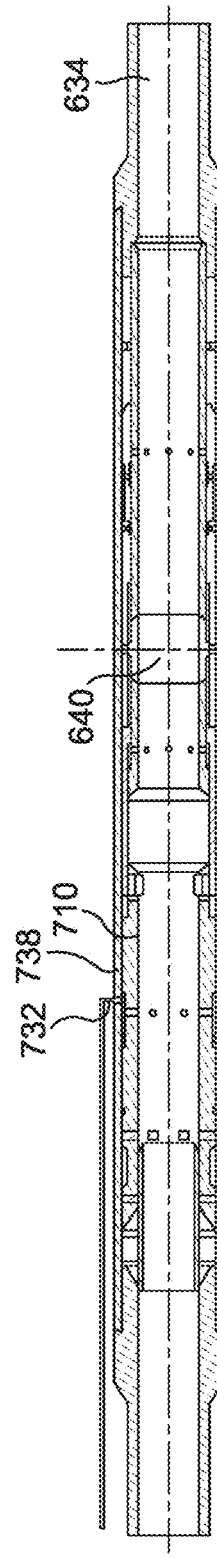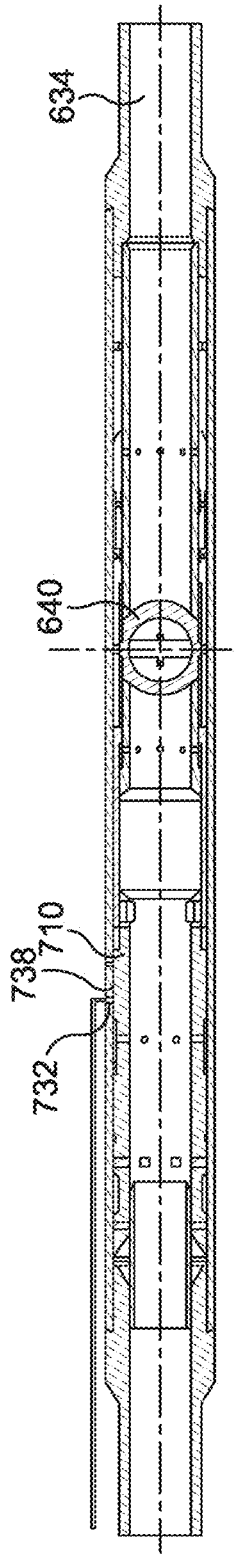

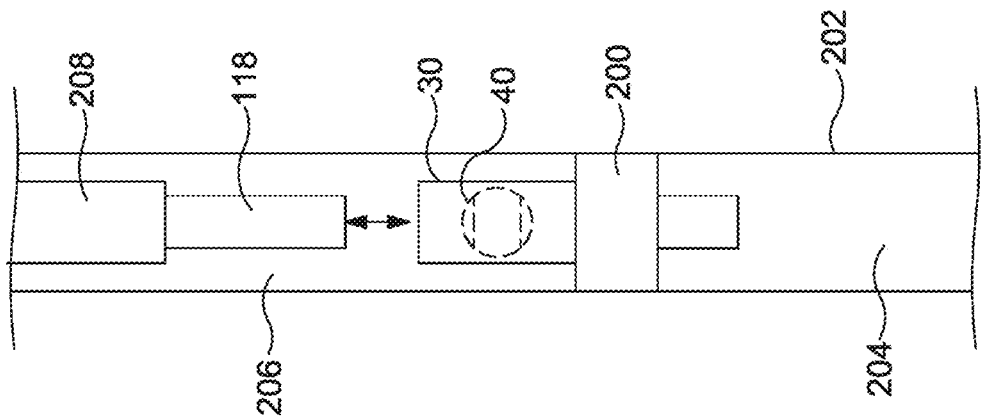
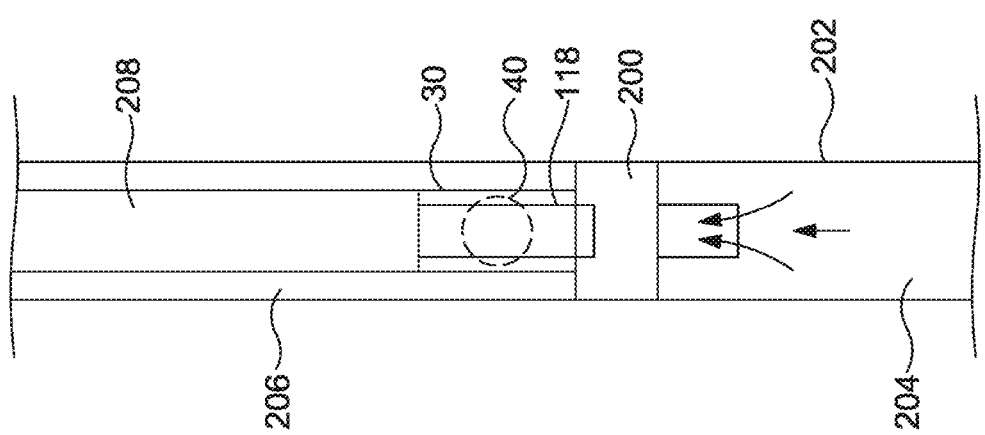
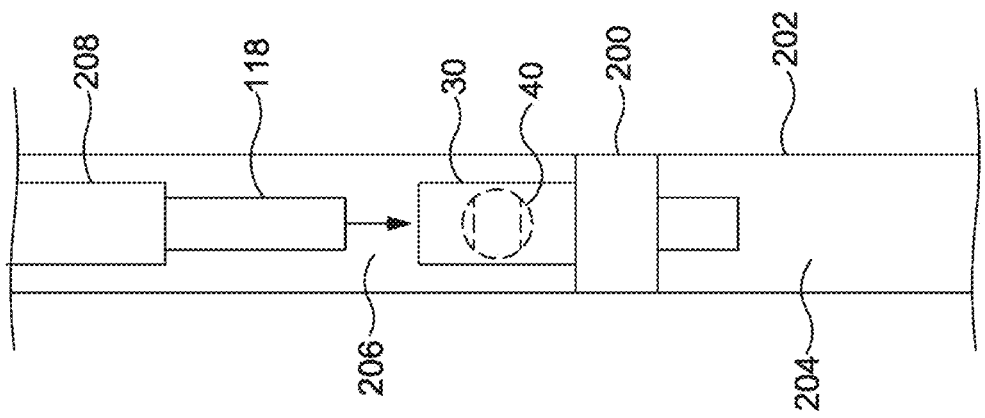

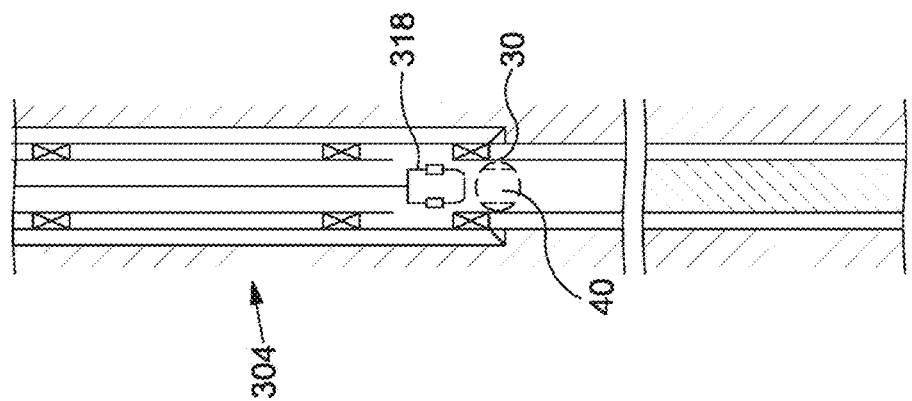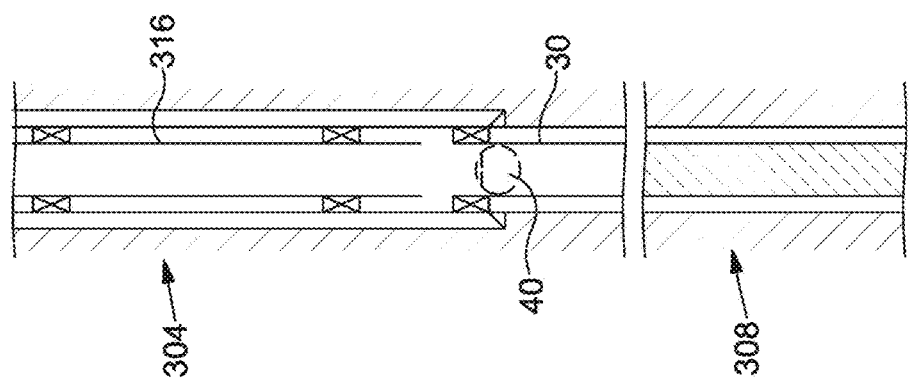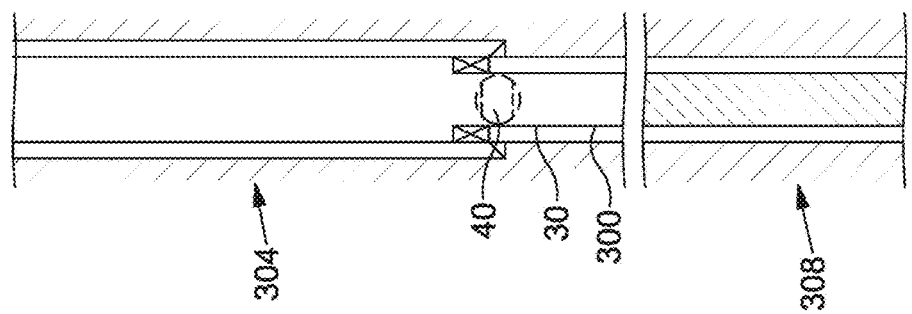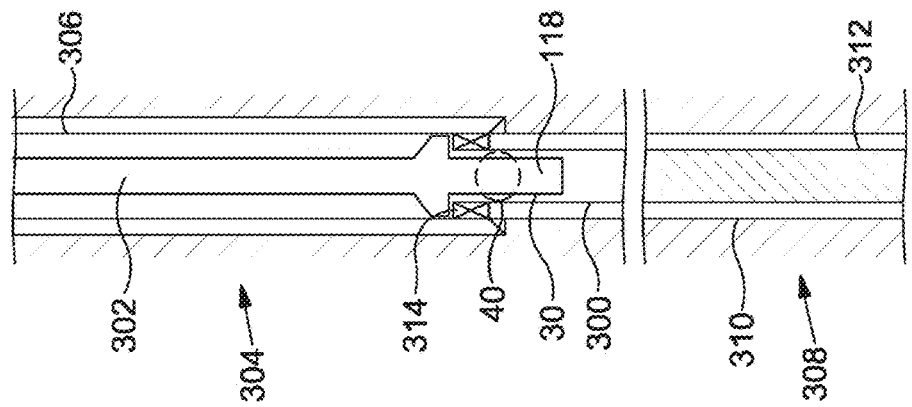

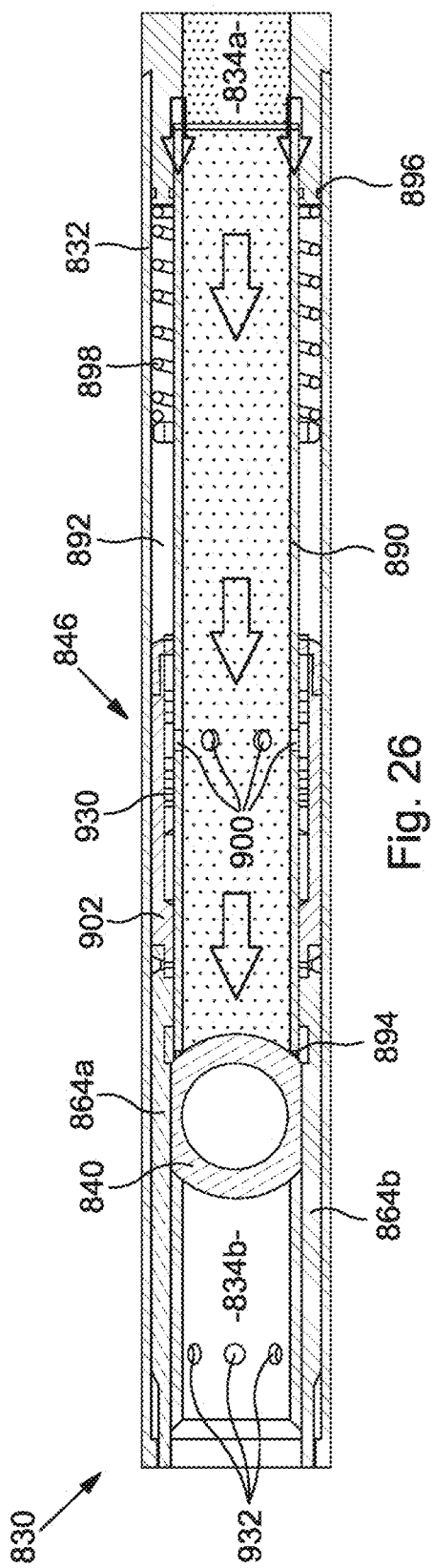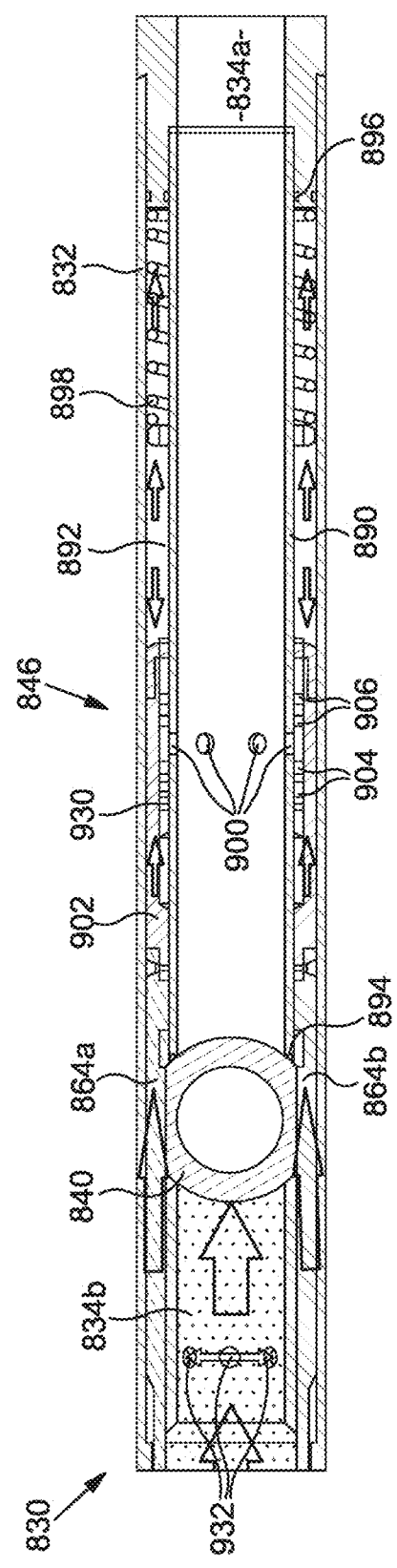
Fig. 26
Fig. 27

VALVE APPARATUS

This application is a national phase under 35 U.S.C. § 371 of PCT International Application No. PCT/GB2018/052599, which has an International filing date of Sep. 13, 2018, which claims priority to Application No. GBSN 1714738.0, filed Sep. 13, 2018, the entire contents of each of which are hereby incorporated by reference.

FIELD

The present disclosure relates to a valve apparatus, for example a downhole ball valve apparatus.

BACKGROUND

Wellbore infrastructure and operations often require the use of valves to provide flow and/or pressure control. For example, valves may be used to control production and/or injection flow rates and pressures, to isolate sections of the wellbore, to contain wellbore pressure and fluids while topside or in-well operations are performed, to facilitate pressure testing, to facilitate tool actuation and the like.

In many cases large differential pressures may be present across a wellbore valve, which may present challenges during operation. For example, a large pressure differential may generate significant friction between a valve member and its seat, such that relative movement therebetween may require very large actuation forces. Furthermore, venting a large pressure differential upon opening of a valve may cause damage to any seals or sealing surfaces between the valve member and its seat.

SUMMARY

An aspect or example relates to a valve apparatus, comprising:
 a housing having a flow path therein;
 a valve member mounted within the housing and being operable between closed and open configurations to control flow along the flow path;
 an actuator assembly moveable from a first position to a second position to sequentially perform first and second actuation functions such that the first actuation function is performed before the second actuation function;
 wherein the first actuation function is associated with the operation of an auxiliary system, and the second actuation function opens the valve member from its closed configuration.

Accordingly, during movement of the actuator assembly from its first position towards its second position the first actuation function is performed resulting in operation of the auxiliary system, while the valve member remains closed. Such an arrangement may permit the valve apparatus to perform an auxiliary function by, or as a result of, the operation of the auxiliary system before operation of the valve apparatus. Following the operation of the auxiliary system, the valve member may be opened during further movement of the actuator assembly towards its second position. Such sequential operation of the auxiliary system and the valve member may assist to establish a desired condition or perform a desired function within, or in relation to, the valve apparatus before opening of the valve member. The desired condition or function may relate to, for example, a change in pressurisation of the valve apparatus, actuation of a tool (e.g. a packer) in communication with the valve apparatus, opening of a fluid port, or the like.

The valve member may be configured to be opened and subsequently closed. This may be achieved by reverse-operation of the actuator assembly, where reverse-operation of the actuator assembly involves moving the actuator assembly from the second position to the first position. Accordingly, the valve apparatus may be openable and closable.

Reverse-operation of the valve member may further operate the auxiliary system, for example reverse-operate the auxiliary system. Alternatively, reverse operation of the actuator assembly may further operate the auxiliary system to a further configuration, e.g. further open a fluid port. Alternatively still, reverse operation of the actuator assembly may have no effect on the operation of the auxiliary system.

The actuator assembly may be moveable from its second position to its first position to further operate the auxiliary system and close the valve member. The actuator assembly may be moveable from its second position to its first position to sequentially further operate the auxiliary system and then close the valve member from its open configuration, such that the auxiliary system is further operated before the valve member is closed.

Alternatively, the valve member may only be operable from the closed configuration to the open configuration, with reverse operation prevented. Such an arrangement may provide a one-shot open valve apparatus. Reverse operation of the valve apparatus may be prevented using a ratchet system, for example.

Similarly, the auxiliary system may only be operable a first time, with further operation of the auxiliary system prevented.

The valve member may provide a sealed barrier within the flow path when said valve member is in its closed position.

The valve member may comprise a rotary valve member which is rotatable to move between its closed and open positions. The valve member may comprise a ball valve member. The valve member may comprise a through bore, wherein when the valve member is in its closed configuration the through bore is misaligned, for example transverse to, the flow path of the housing, and when the valve member is in its open position the through bore is aligned with, for example parallel to and/or coaxial with the flow path.

The valve member may be rotatable about a rotation axis. The valve member may be supported, for example rotatably supported about its rotation axis. In one example the valve member may comprise one or more rotary axis mounts aligned with the rotation axis. A rotary axis mount may comprise a bore configured to receive an external shaft. A rotary axis mount may comprise a shaft, such as a spigot, pin or the like extending from the valve member and aligned with the rotation axis.

The valve member may be rotatably supported about a peripheral surface thereof. Such an arrangement may allow the valve member to be provided without dedicated rotary axis mounts. This may have benefits in creating additional space within the valve apparatus to increase the size of the valve member, which may permit an increase in the through-bore dimension of the valve member to be achieved. Benefits may be created in reducing the complexity of the valve member and associated mounting within the valve apparatus.

The valve apparatus may comprise a valve seat configured to cooperate with the valve member. The valve seat may function to support the valve member. In one example the valve seat may function to rotatably support the valve member during movement of the valve member between its closed and open positions. In some examples the rotary guidance and support provided by the valve seat may minimise or eliminate the requirement for the valve member to include dedicated rotary axis mounts.

A sealing arrangement may be defined between the valve seat and the valve member for providing a sealed barrier within the flow path when the valve member is in its closed position. The sealing arrangement may comprise or be defined by an interference seal, for example a metal-to-metal seal, between the valve member and the valve seat. The sealing arrangement may comprise one or more sealing members interposed between the valve member and the valve seat. In one example one or more sealing members may be mounted on the valve seat. One or more sealing members may comprise an elastomeric material, PTFE or the like.

In one example the valve seat may be supported by the housing. The valve seat may be integrally formed with the housing. Alternatively, the valve seat may be separately formed from the housing. Such an arrangement may assist to facilitate improved manufacture and/or redressing or maintenance of the valve apparatus.

The valve seat may be mounted or provided on a sleeve, hereinafter defined as a seat sleeve which is mounted within the housing. In one example the valve seat may be defined or provided on one end of the seat sleeve. The valve seat may be separately formed from the seat sleeve. Alternatively, the valve seat may be integrally formed with the seat sleeve. Integrally forming the valve seat with the seat sleeve may reduce the number of components provided within the valve apparatus, which may minimise costs, improve manufacture/assembly and the like.

The seat sleeve may comprise a unitary component or multiple components. At least a portion of the seat sleeve may be formed separately from the housing. At least a portion of the seat sleeve may be integrally formed with the housing.

The seat sleeve may define a flow path therethrough (e.g., axially therethrough). The flow path of the seat sleeve may define a portion of the flow path of the housing. In such an arrangement the seat sleeve may define a flow sleeve.

The seat sleeve may be moveably mounted within the housing. Such an arrangement may provide a degree of compliance within the valve assembly, for example to absorb any pressure shock loading which may be present within the valve assembly when in use. Furthermore, relative movement between the seat sleeve and the housing may facilitate biasing of the seat sleeve, for example to contribute to an improved seal between the valve seat and the valve member at least when the valve member is in its closed configuration.

The seat sleeve may be sealed relative to the housing with a sleeve seal arrangement. The sleeve seal arrangement may comprise one or more seal members, such as O-ring members. The sleeve seal arrangement may comprise or define a dynamic sealing arrangement configured to provide sealing during relative movement between the seat sleeve and the housing. Sealing between the seat sleeve and the housing may permit fluid pressure within the valve apparatus to generate a bias force on the seat sleeve. In one example the seat sleeve may be pressure biased in a direction to engage the valve seat against the valve member. Such an arrangement may assist to increase a sealing effect at least when the valve member is in its closed position and exposed to a pressure differential.

In one example, the sleeve seal arrangement may be exposed to the same pressure differential applied on opposing sides of the valve member when said valve member is in its closed configuration.

The valve apparatus may comprise a movement limiter for limiting movement, for example axial movement, of the seat sleeve relative to the housing, at least in one relative direction. In one example the valve apparatus may comprise an axial shoulder, for example provided on the housing, which axially limits movement of the seat sleeve relative to the housing, at least in one relative direction.

The valve apparatus may comprise a biasing arrangement for providing a biasing force between the valve member and the valve seat. In one example the biasing arrangement may bias the valve member and the valve seat into engagement with each other. The biasing arrangement may act on one or both of the valve member and the valve seat. In one example the biasing arrangement may act on the valve seat, to bias the valve seat into engagement with the valve member.

The biasing arrangement may act on the seat sleeve to provide biasing of the valve seat against the valve member. The biasing arrangement may act between the seat sleeve and the housing. In one example the seat sleeve may comprise an annular lip structure for providing engagement with the biasing arrangement. The annular lip structure may be integrally formed with the seat sleeve. Alternatively, the annular structure may be separately formed from the seat sleeve, for example provided in the form of a ring. In one example the annular lip structure may engage an axial shoulder or no-go profile formed on the seat sleeve.

The biasing arrangement may comprise a spring biasing arrangement, or the like.

The seat sleeve may define an annular space with the housing. While the space may be defined as being "annular", the space may not be strictly annular in shape, but may be any shape dictated by the shape of the housing and the seat sleeve and/or alignment therebetween.

The valve apparatus may comprise a guide sleeve which provides support to the valve member. The guide sleeve may be located on an opposite side of the valve member from the seat sleeve. In such an arrangement the valve member may be interposed between the guide sleeve and the seat sleeve. The guide sleeve may define a bearing surface which rotatably supports the valve member.

The guide sleeve may be axially engaged with the housing, for example via a shoulder, no-go profile or the like.

In one example, the auxiliary system may comprise a pressure relief arrangement. The pressure relief arrangement may be operable between closed and open configurations to selectively permit pressure communication of the flow path on opposing sides of the valve member when said valve member is in its closed configuration.

The actuator assembly may be moveable from an initial position to a subsequent position to sequentially open the pressure relief arrangement and the valve member from their respective closed configurations, such that the pressure relief is opened before the valve member. The initial position may correspond to the first position of the actuator assembly, and the subsequent position may correspond to the second position of the actuator assembly.

Accordingly, during movement of the actuator assembly from its initial position towards its subsequent position the pressure relief arrangement may be operated to open while the valve member remains closed. Such an arrangement may permit pressure on opposing sides of the closed valve member to at least partially equalise, minimising or reducing a pressure differential across the closed valve member. The valve member may then be subsequently opened, during further movement of the actuator assembly towards its second position. Such opening of the valve member may thus be performed while exposed to a reduced or minimised pressure differential. This may minimise resistance forces, such as frictional forces, which may otherwise retard opening of the valve member. For example, a large pressure differential may press the valve member against a valve seat, establishing resistance to opening of the valve member. Further, minimising or reducing the pressure differential prior to opening the valve member may minimise a rapid relief of pressure through the valve member upon opening, which may potentially damage the valve member and/or related features, such as seals and the like.

The actuator assembly may be moveable to open the pressure relief arrangement before moving the valve member. Further, the actuator assembly may be axially moveable to axially move the pressure relief arrangement to its open configuration before moving the valve member. In some examples, the axial movement of the actuator assembly to axially move the pressure relief arrangement does not axially move the valve member. Accordingly, axial movement of the pressure relief arrangement does not require any axial movement of the valve member which may be under a large pressure differential. Therefore the pressure force that the actuator assembly has to overcome to axially move the pressure relief arrangement is minimised.

The pressure relief arrangement may comprise a bypass flow path extending or defined externally of the flow path. The bypass flow path may be presented in communication with the flow path of the valve apparatus on opposing sides of the valve member when the pressure relief arrangement is in its open configuration. At least a portion of the bypass flow path may be defined between the seat sleeve and the housing (e.g., within the annular space). When the pressure relief arrangement is configured in its open configuration the bypass flow path provides pressure communication between opposing sides of the valve member, such that when the valve member is closed pressure on opposing sides thereof may at least partially equalise.

The pressure relief arrangement may comprise a pressure relief valve assembly operable between closed and open configurations by the actuator assembly. The pressure relief valve assembly may be operable within the bypass flow path.

The pressure relief arrangement may comprise a pressure relief port arranged in communication with one side of the valve member. The pressure relief port may, when the pressure relief arrangement is open, facilitate fluid communication between the flow path of the housing on one side of the valve member and the bypass flow path.

In one example the pressure relief port may be provided on or through the seat sleeve. The pressure relief port may extend through a wall of the seat sleeve.

The pressure relief arrangement may comprise a plurality of pressure relief ports. In one embodiment at least two pressure relief ports may be circumferentially arranged. In one example at least two pressure relief ports may be axially arranged.

The pressure relief arrangement may comprise a pressure relief valve member moveable by the actuator assembly to open (and optionally close) the pressure relief port. The pressure relief valve member may be located between the seat sleeve and the housing (e.g., within the annular space).

The pressure relief valve member may be axially moveable by the actuator assembly. The pressure relief valve member may comprise a valve sleeve.

Locating the pressure relief valve member between the seat sleeve and the housing, to be in the bypass flow path, may reduce the axial pressure differential across the pressure relief arrangement. Therefore the retarding effect of a pressure differential across the pressure relief valve member may be minimised.

In one example, when the pressure relief arrangement is in its closed configuration the pressure relief valve member may occlude the pressure relief port. In one example the pressure relief valve may comprise a sealing arrangement for sealing the pressure relief port. The sealing arrangement may comprise a pair of axially spaced sealing members which are positioned on opposing axial sides of (i.e., straddle) the pressure relief port when the pressure relief arrangement is in its closed configuration.

Pressure on the opposing, axially spaced, seals may have an axially opposing effect. The seals may be sized such that the axially opposing pressure may be balanced.

Therefore, the pressure relief arrangement may be axially pressure balanced. This may ease movement of the pressure relief arrangement by the actuator assembly.

The aforementioned valve seat and the sealing arrangement provide a pressure barrier. The pressure barrier is entirely on one side of the valve member.

The pressure relief valve member may be moved by the actuator assembly to uncover the pressure relief port.

The pressure relief valve member may comprise a valve port, wherein the valve port is aligned with the pressure relief port when the pressure relief arrangement is in its open configuration.

The auxiliary system may comprise a tool actuator. The tool actuator may be in communication with a tool, and may be operable to actuate, e.g. set, the tool when required.

The tool actuator may be in communication with any appropriate tool, for example a packer, a bridge plug, a valve such as an injection or ball valve, or the like.

Such a tool actuator may be pressure operated, for example operated by pressure contained in the flow path of the valve apparatus. The housing may comprise an auxiliary port for the attachment of a tool to be actuated by the tool actuator. The tool actuator may comprise an actuator sleeve. The actuator sleeve may be slidably moveable within the valve apparatus to selectively occlude and open the tool port. The actuator sleeve may be moved as a result of movement of the actuator assembly.

The tool may comprise a conduit connected to the tool port in the housing, such that said tool may have a location away from the valve apparatus.

The actuator assembly may be or comprise a rotary actuator assembly.

The actuator assembly may be or comprise a linear actuator assembly.

In one example the actuator assembly may be or comprise a linear actuator assembly operable to at least one of linearly move and rotate the valve member. In one particular example the linear actuator assembly may be operable to rotate the valve member.

In one example the actuator assembly may be or comprise a linear actuator assembly operable to at least one of linearly and rotatably operate the auxiliary system. In one particular example the actuator assembly may be or comprise a linear actuator assembly operable to linearly operate the auxiliary system.

In one particular example the actuator assembly may be or comprise a linear actuator assembly operable to rotate the valve member and linearly operate the pressure relief arrangement.

The actuator assembly may be rigidly engaged with, for example axially rigidly engaged with, the auxiliary system or a part of the auxiliary system. For example, the actuator assembly may be engaged with a valve member, sleeve member, or the like of the auxiliary system. In such an arrangement, movement of the actuator assembly may provide corresponding and simultaneous movement of the auxiliary system, or part of the auxiliary system. The actuator assembly may be rigidly engaged with the auxiliary system via an inter-engaging profile, such as a hook-type profile. The actuator assembly may be rigidly engaged with the auxiliary system via one or more mechanical fasteners, such as screws, bolts or the like.

The auxiliary system may be integrated into, or form a part of, the actuator arrangement. For example, any members, e.g. valve members, sleeve members, of the auxiliary system may be also form part of the actuator arrangement.

The actuator assembly may be non-rigidly engaged with the valve member. In one example a lost motion arrangement may be defined between the actuator assembly and the valve member. Such a lost motion arrangement may permit the actuator assembly to move in a first movement phase over a first distance from its first position and partially towards its second position without corresponding operation of the valve member. The auxiliary system may be operated during this first movement phase of the actuator assembly, while the valve member remains closed. The valve member may be opened during continued movement of the actuator assembly in a second and sequential movement phase over a second distance towards its second position.

The first and second movement phases may be sequential and continuous. The first and second distances may collectively define a total distance of the actuator assembly from its first to second positions.

The first and second movement phases of the actuator assembly may be axial movement phases. The first axial movement phase of the actuator assembly may axially move the pressure relief arrangement to its open configuration. In some circumstances, the first axial movement phase of the actuator assembly does not move the valve member axially. Accordingly, axial movement of the pressure relief arrangement in the first movement phase does not require any axial movement of the valve member which may be under a large pressure differential. Therefore the pressure force that the actuator assembly has to overcome to axially move the pressure relief arrangement in the first movement phase is minimised.

The actuator assembly may comprise a valve member interface for engaging and driving the valve member towards its open configuration during movement of the actuator assembly towards its second position. The valve member interface may be separated, for example axially separated, from engagement with the valve member when the actuator assembly is in its first position. Such an arrangement may permit a degree of lost motion between the actuator assembly and the valve member (during which lost motion the auxiliary system is operated). The valve member interface and the valve member may be separated by a first distance when the actuator assembly is in its first position. In such an arrangement the actuator assembly must be moved in a first movement phase over the first distance from its first position to engage the valve member.

Where the auxiliary system is the pressure relief arrangement, the lost motion between the actuator assembly and the valve member may allow the pressure relief arrangement to open before any movement of the valve member occurs. Therefore, the pressure across the valve member may be at least partially equalised before the valve member interface engages the valve member to move the valve member. This may minimise resistance forces, such as frictional forces, which may otherwise retard movement of the valve member.

A yoke mechanism or arrangement may be defined between the actuator assembly and the valve member to permit linear movement of the actuator assembly to be converted to rotation of the valve member.

The valve member interface may engage the valve member at a location which is laterally offset from a rotation axis of the valve member. Such an arrangement may permit the valve member to be rotated during movement, for example linear movement, of the actuator assembly.

The valve member may comprise a follower interface arranged for engagement by the valve member interface of the actuator assembly. The valve member interface may act on the follower interface during movement of the actuator assembly towards its second position to move, for example rotate, the valve member towards its open configuration. When the valve member is in its closed configuration the follower interface may be arranged to be engaged by the valve member interface of the actuator assembly at a laterally offset position.

The follower interface may comprise a rib having at least one portion which is laterally offset from a rotation axis of the valve member. The follower interface may comprise a rib extending laterally through a rotation axis of the valve member. That is, the rib may extend on opposing lateral sides of the rotation interface.

The valve member interface may comprise a rotation stop to prevent over rotation of the valve member. The rotation stop may limit rotation of the valve member upon establishing or reaching its open configuration. In one example the valve member interface may become engaged with the valve member, for example a follower interface, such as a rib, of the valve member on opposing lateral sides of an effective valve member rotation axis to provide a rotation stop. Such engagement may be established when the valve member is in its open configuration. Such engagement may eliminate any moment applied on the valve member about its rotation axis.

The actuator assembly may comprise a first valve member interface which engages the valve member to open the valve member when the actuator assembly is moved in a first direction towards its second position. The actuator assembly may comprise a second valve member interface which is axially separated from the first valve member interface. The second valve member interface may engage the valve member to close the valve member when the actuator assembly is moved in a second, reverse direction towards its first position. Such an arrangement may facilitate reverse operations of the valve member.

The axial spacing between the first and second valve member interfaces may define or provide lost motion between the actuator assembly and the valve member in reverse directions of operations. Such an arrangement may facilitate sequential operation of the auxiliary system and the valve member in reverse directions of operation.

The actuator assembly may comprise an axial slot configured to accommodate a rotary axis mount of the valve member, such as a pin, boss or the like. Such an axial slot may provide rotary support to the valve member, which still permitting relative axial movement between the actuator assembly and the valve member.

The actuator assembly may extend from one side of the valve member to engage the auxiliary system, or part thereof, on an opposing axial side of the valve member.

The pressure relief arrangement may form a seal on a first side of the valve member, and the actuator assembly may be operated from a second side of the valve member opposite the first side. The valve seat may be located on the first side of the valve member. The pressure relief arrangement and the valve seat may form a pressure barrier on the first side of the valve member, therefore containing any pressure differential to the first side of the valve member. Accordingly, where there is pressure on the first side of the valve member, the effect of this pressure on the actuator arrangement may be minimised. This may ease movement of the actuator assembly. Furthermore, the risk of damage to the apparatus on the second side of the valve member, in the event of an excessive pressure differential, may be minimised.

The actuator assembly may comprise an actuator member which extends to engage both the valve member and auxiliary system, or part thereof. The actuator member may be generally elongate. The actuator member may comprise the valve member interface.

One end of the actuator member may engage the auxiliary system, or part thereof. An intermediate portion of the actuator member may comprise the valve member interface.

A single actuator member may be provided. A plurality of actuator members may be provided. In one example a pair of diametrically opposed actuator members may be provided.

The actuator assembly may comprise a force interface to receive an actuation force to facilitate movement of the actuator assembly. The force interface may be coupled to or otherwise engaged with one or more actuator members.

The force interface may be configured to receive an axial actuation force.

The force interface may be arranged to receive an actuation force in a single direction, for example in a direction to cause the actuator assembly to move from its first position towards its second position.

The force interface may be arranged to receive an actuation force in reverse directions, to permit reverse operation of the actuator assembly.

The force interface may define a fluid interface for receiving a fluid originating force, such as a hydraulic force, pneumatic force or the like. For example, the force interface may comprise or form part of a fluid piston assembly.

The force interface may define a mechanical interface for mechanical engagement with an operator, such as an operator tool or the like.

In one example the valve apparatus may be located downhole in a closed configuration, and an operator tool deployed to engage the force interface and operate the actuator assembly. In some examples the operator tool may be deployed on a deployment medium, such as tubing, wireline or the like.

An operator tool may be utilised to configure the valve member into its open position, and subsequently deployed downhole with the valve member, wherein when the valve member is located at the desired downhole position the operator tool may be retrieved, with such retrieval causing the valve apparatus to be closed through engagement with the force interface.

The force interface may comprise an indexing arrangement for engagement by an operator tool.

The force interface may be configured for movement by an operator tool between first and second positions. The first position of the force interface may correspond to the first position of the actuator assembly, and the second position of the force interface may correspond to the second position of the actuator assembly. In some examples the force interface may be deactivated when in its second configuration, such that further operation may be prevented. In other examples the force interface may facilitate reverse operation and thus moveable between its second and first positions.

The force interface may comprise a first variable restriction. When the force interface is in its first position the first variable restriction may be arranged for engagement by an operator tool to prevent passage of the operator tool. Such an arrangement may permit the operator tool, when moving in a first direction, to drive the force interface in the same first direction. When the force interface reaches its second position the variable restriction may be reconfigured or deactivated to permit passage of the operator tool.

The force interface may comprise a second variable restriction. The second variable restriction may be activated when the force interface reaches its second position, such that the second variable restriction is presented for engagement by the operator tool when said operator tool is moved in a second direction, opposite to the first direction. When the force interface is in its first position the second variable restriction may be reconfigured or deactivated to permit passage of the operator tool.

The operator tool may comprise a stinger, arranged to stab into the valve apparatus. Such stab-in of the stinger may function to operate the valve to cause the valve member to open. The stinger may extend through the valve member when said valve member is opened. Such an arrangement may provide protection to the valve member when said valve member is open.

The stinger may remain in place within the valve member. The stinger may, for example, form part of a fluid conduit. For example, the stinger may form part of a velocity string associated with an artificial lift system, such as an ESP system.

The stinger may be retrieval from the valve apparatus. Such retrieval may cause the valve apparatus to be closed. Alternatively, retrieval of the stinger may not provide any operation to the valve apparatus.

The force interface may comprise a sleeve. The sleeve may carry one or more radially moveable dogs which function as variable restrictions. For example, one or more dogs may be selectively radially supported and unsupported in accordance with an axial position of the force interface within the valve apparatus. Such radial support may be provided within the housing. In some examples the housing may comprise one or more regions of relief, wherein the radial dogs may become unsupported when aligned with the one or more regions of relief.

The housing may define a unitary component. The housing may define multiple components secured together.

The valve apparatus may comprise at least one connector to facilitate connection with a further component, such as a further downhole component, for example a completion string, production string, packer, ESP system or the like. At least one connector may comprise a threaded connector, for example. At least one connector may form part of the housing.

The valve apparatus may be a downhole valve apparatus, for use within a wellbore. The valve apparatus may form part of a packer assembly, for example a packer assembly associated with an Electric Submersible Pump (ESP). The valve apparatus may form part of an isolation system, for example to isolate different sections of a wellbore.

An aspect or example relates to a method for providing fluid control within a flow path using a valve apparatus according to any other aspect.

An aspect or example relates to a packer assembly. The packer assembly may comprise a valve apparatus according to any other aspect.

An aspect or example relates to a downhole valve apparatus.

Features defined in relation to one aspect of the invention may be provided in combination with any other aspect of the invention.

A further aspect or example relates to a valve apparatus, comprising:
- a housing having a flow path therein;
- a valve member mounted within the housing and being operable between closed and open configurations to control flow along the flow path;
- a pressure relief arrangement operable between closed and open configurations to selectively permit pressure communication on opposing sides of the valve member when said valve member is in its closed configuration; and
- an actuator assembly moveable from a first position to a second position to sequentially open the pressure relief arrangement and the valve member from their respective closed configurations, such that the pressure relief arrangement is opened before the valve member.

The features of any of the above described aspects may be used in combination with the features of any other aspect. In particular, in some embodiments the pressure relief arrangement may be or form a part of the auxiliary system.

BRIEF DESCRIPTION OF THE DRAWINGS

These and other aspects or examples will now be described, by way of example only, with reference to the accompanying drawings, in which:

FIG. 1 is a cross-sectional view of a downhole valve apparatus in an initial configuration, in which a ball valve member is closed;

FIG. 2 is a perspective view of the ball valve member of the valve apparatus of FIG. 1;

FIG. 3 is a perspective view of actuator members of the valve apparatus of FIG. 1;

FIG. 4 is a perspective view of the ball valve member of FIG. 2 assembled with the actuator members of FIG. 3;

FIG. 5 illustrates the relative positioning between the actuator members and the ball valve member when the valve apparatus is in the initial configuration of FIG. 1;

FIG. 6 is an enlarged view of region "6" of FIG. 1;

FIG. 9 illustrates the valve apparatus of FIG. 1 during initial actuation using the stinger tool, in which pressure equalisation on opposing sides of the closed ball valve member is permitted;

FIG. 10 is an enlarged view of region "10" of FIG. 9;

FIG. 11 illustrates the relative positioning between the actuator members and the ball valve member when the valve apparatus is in the configuration of FIG. 9;

FIG. 15 illustrates the stinger tool being deployed through the open ball valve member;

FIG. 16 illustrates the stinger tool being retracted from the valve apparatus to initiate closure of the ball valve member;

FIG. 17 is an enlarge view of region "17" of FIG. 16;

FIG. 18 illustrates the relative positioning between the actuator members and the ball valve member when the valve apparatus is in the configuration of FIG. 16;

FIG. 19 is a perspective view of a modified ball valve member;

FIG. 20 is a perspective view of modified actuator members;

FIG. 21 is a perspective view of the ball valve member of FIG. 19 assembled with the actuator members of FIG. 20;

FIGS. 22A-F illustrate a cross-sectional view of an example of the valve apparatus showing the steps of operation.

FIGS. 23A-F illustrate a cross-sectional view of a further example of the valve apparatus showing the steps of operation.

FIGS. 24A-C schematically illustrate an example use of a valve apparatus;

FIGS. 25A-D schematically illustrate a further example use of a valve apparatus;

FIG. 26 illustrates pressure below a further example of a valve apparatus, wherein the ball valve is closed; and FIG. 27 illustrates pressure above the valve apparatus of FIG. 26, wherein the ball valve is closed.

DETAILED DESCRIPTION OF THE DRAWINGS

Figure 7:
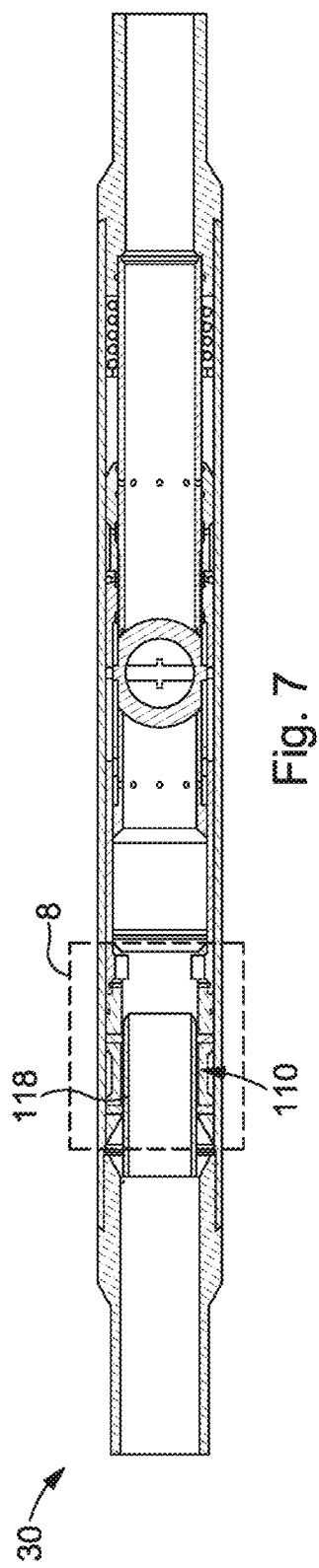
FIG. 7 illustrates the valve apparatus of FIG. 1 with a stinger tool deployed therein.

FIG. 1 is a longitudinal cross-sectional view of an exemplary ball valve apparatus, generally identified by reference numeral 30. The valve apparatus 30 may be suitable for use in multiple environments, industries and applications. In the present exemplary description, the ball valve apparatus 30 is intended for use within a wellbore, and as such may be defined as a downhole ball valve apparatus.

The apparatus 30 includes a housing 32 which defines a longitudinal flow path 34 extending between first and second opposing ends 36, 38, wherein in the example illustrated the first end 36 may define an uphole end, and the second end 38 may define a downhole end. Of course, the valve apparatus 30 may be deployed in an inverted orientation.

Figure 12:
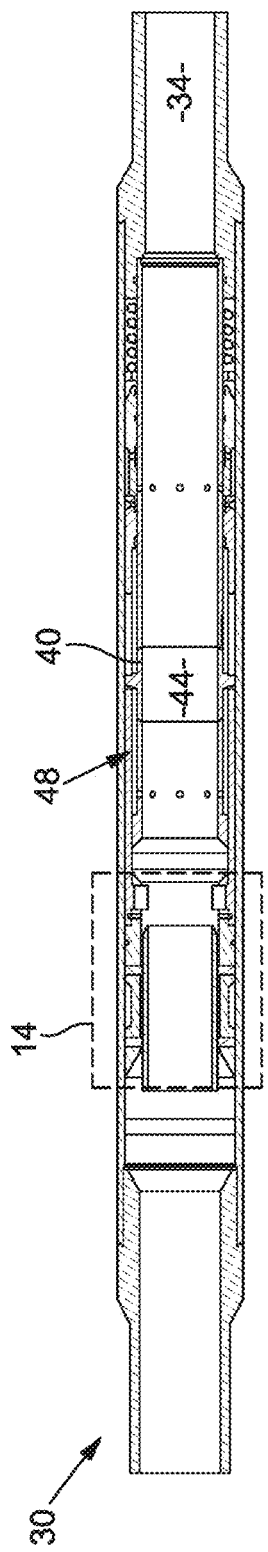
FIG. 12 illustrates the valve apparatus of FIG. 1 with the ball valve member configured in an open position.

A ball valve member 40 is mounted within the housing 32 and as will be described in detail below is rotatable about a rotation axis 42 from a closed position, as illustrated in FIG. 1, to an open position, for example as shown in FIG. 12, to control flow along the flow path 34.

The apparatus 30 further includes a pressure relief arrangement 46 which is operable between closed and open configurations to permit pressure communication on opposing sides of the valve member 40 when said valve member 40 is closed, to facilitate pressure equalisation. The form and operation of the pressure relief arrangement 46 will be described in detail below.

The apparatus 30 further includes an actuator assembly 48 which is axially moveable relative to the housing 32 between first and second positions to sequentially open the pressure relief arrangement 46 and the valve member 40 from their respective closed positions or configurations, such that during operation the pressure relief arrangement 46 is opened before the valve member 40. This arrangement may permit pressure to equalise across the closed valve member 40. This may assist to minimise the effect any large pressure differential may otherwise have in retarding opening of the valve member 40. Further, pressure equalisation may avoid rapid pressure relief through the valve member 40 which may otherwise happen if opened while exposed to a large pressure differential. The form and operation of the actuator assembly 48 will be described in more detail below.

The first end 36 of the housing 32 is defined by or on an upper connector sub 50 which forms part of the housing 32, and includes a connector portion 52, such as a threaded portion, which may facilitate connection with an upper flow system (not shown). Similarly, the second end 38 is defined by or on a lower connector sub 54 which forms part of the housing 32, which also includes a connector portion 56, such as a threaded portion, which may facilitate connection with a lower flow system (not shown). Thus, the valve apparatus 30 may be configured to be connected in-line with a flow system.

In the example illustrated the connector subs 50, 54 are threadedly interconnected with a housing sleeve 58, such that the housing 32 in the illustrated example is formed by the upper and lower connection subs 50, 54 and the housing sleeve 58. Of course, the housing 32 may comprise additional components. For example, the housing sleeve 58 may be formed in multiple interconnected parts.

A perspective view of the valve member 40 in isolation is illustrated in FIG. 2, reference to which is additionally made. The valve member 40 is generally spherical in form and includes a throughbore 44 which is arranged transverse to the flow path 34 to close the flow path 34, and aligned with the flow path 34 to permit flow. The valve member 40 includes opposing interface structures 59 (only one visible in FIG. 2) which facilitate mounting and operation of the valve member 40 within the apparatus 30. Each interface structure 59 includes a rotary axis mount in the form of a pin 60 which extends along the rotary axis 42 and which facilitates or contributes to rotary mounting of the valve member 40 within the apparatus 30. Each interface structure 59 also includes an interface rib 62 which extends laterally through the rotation axis 42, and is obliquely aligned relative to the throughbore 44. The pin 60 is upstanding from the interface rib 62, with the valve member 40, rib 62 and pin 60 being integrally formed, e.g., machined, from a single component.

The actuator assembly 48 includes first and second actuator arms 64a, 64b which are mounted within the valve apparatus 30 on diametrically opposing sides of the valve member 40. A perspective view of the actuator arms 64a, 64b in isolation is shown in FIG. 3, reference to which is additionally made. Each actuator arm 64a, 64b includes a respective intermediate elongate slot 70a, 70b which, as will be described below, receive a respective valve rotation pin 60 of the valve member 40 (FIG. 2).

Each actuator arm 64a, 64b also includes structural features which are configured to engage the interface ribs 62 of the valve member 40 (see FIG. 2) to cause rotation of the valve member 40. Such structural features are only visible on the second actuator arm 64b, although it should be noted that these structural features are replicated (in mirror image) on the first actuator arm 64a. The structural features include a first valve interface in the form of a first drive pin 72 and a second valve interface in the form of a second drive pin 74 which is axially spaced form the first drive pin 72. A first rotation stop 76 is positioned adjacent the first drive pin 72, and similarly a second rotation stop 78 is positioned adjacent the second drive pin 74.

The first and second actuator arms 64a, 64b are shown assembled with the valve member 40 in FIG. 4, with the valve member 40 mounted between the actuator arms 64a, 64b and the valve rotation pins 60 received within a respective elongate slot 70a, 70b. FIG. 4 illustrates the valve member 40 in its closed position (i.e., the throughbore 44 is transverse to the flow path 34 of the apparatus 30).

FIG. 5 is a view of the assembly of FIG. 4 from below. When the valve member 40 is in its illustrated closed position, the interface rib 62 of the valve member 40 is engaged with both the second interface pin 74 and the second rotation stop 78 of the second actuator arm 64b, while the first actuator pin 72 and rotation stop 76 are axially spaced from the interface rib 62. Although not illustrated, a similar engagement is present between the opposing side of the valve member 40 and the first actuator arm 64a.

Referring again to FIG. 1, the valve apparatus 30 includes a guide sleeve 80 mounted on one side (an upper side in the example) of the valve member 40, wherein the guide sleeve 80 includes an end surface 82 which is rotatably engaged with the valve member 40 to provide rotary guidance and support thereto. An opposite end 84 of the guide sleeve 80 is engaged with a shoulder 86 formed on the inner surface of the housing 32.

The guide sleeve 80 defines cut-outs 88 to accommodate passage of the first and second actuator arms 64a, 64b.

The valve apparatus 30 further includes a valve seat sleeve 90 mounted within the housing 32 on an opposite side of the valve member 40 from the guide sleeve 80, with an annular space 92 defined between the housing 32 and the seat sleeve 90. One end (the upper end) of the seat sleeve 90 defines a valve seat 94 which rotatably supports the valve member 40. When the valve member 40 is in its illustrated closed position, the valve member 40 and valve seat 94 cooperate to seal the flow path 34. Further, the seat sleeve 90 is sealed against the housing 32 via a dynamic seal 96, such that when the valve member 40 is in its closed position complete sealing of the flow path 34 may be provided. More specifically, when the valve apparatus 30 is fully closed with pressure above the valve member 40 dominating, the valve member 40 will effectively be pressed against the valve seat 94 to retain sealed engagement therebetween. The dynamic seal 96 between the housing 32 and seat sleeve 90 functions to prevent fluid to bypass the valve member 40. Conversely, when the valve apparatus 30 is fully closed with pressure below the valve member 40 dominating, the seat sleeve 90 will function as an annular piston (defined with respect to the sealed areas formed at the valve seat 94 and the dynamic seal 96), effectively driving the seat sleeve 90 against the valve member 40 to retain sealed engagement therebetween. In this respect, any upward movement of the valve member 40 will be limited by engagement of the guide sleeve 80 with the shoulder 86 of the housing 32. Thus, a pressure differential across the valve member 40 acting in any direction will have the effect of pressing the valve member 40 and valve seat 94 together. This may have benefits in providing self-energising within the valve apparatus 30 to improve sealing when closed. However, such self-energising effect may be removed upon opening of the pressure relief arrangement 48.

The seat sleeve 90 is axially biased by a spring 98 located within the annular space 92 in a direction to press the valve seat 94 and valve member 40 together.

The seat sleeve 90 defines a circumferential array of pressure relief ports 100 which, as will be described in more detail below, are selectively opened by the pressure relief arrangement 46 to facilitate pressure equalisation across the closed valve member 40.

The pressure relief arrangement 46 will now be described with additional reference to FIG. 6 which is an enlarged view of region "6" of FIG. 1. The pressure relief arrangement 46 includes a valve sleeve 102 which is located within the annular space 92 between the housing 32 and the seat sleeve 90, wherein the valve sleeve 102 is rigidly connected to the lower ends of the first and second actuator arms 64*a*, 64*b* of the actuator assembly 48. The valve sleeve 102 includes a pair of axially separated seals 104, 106 which axially straddle and thus seal the pressure relief ports 100 when the pressure relief arrangement 46 is in its illustrated closed configuration. The valve sleeve 102 further includes an array of valve ports 108.

The seals 104, 106, and the dynamic seal 96 of the valve seat 94 form a pressure barrier, as will be described in more detail below Referring again to FIG. 1, the actuator assembly 48 further includes a force interface 110 which is rigidly connected to the upper ends of the first and second actuator arms 64*a*, 64*b*. The force interface 110 includes a sleeve member 112 which carries a first array of circumferentially arranged dogs 114, and a second array of circumferentially arranged dogs 116, wherein the first and second arrays of dogs 114, 116 are radially moveable. The force interface 110 is configured for engagement with an operator tool (not shown) to move the actuator assembly 48, as described in more detail below.

Figure 8:
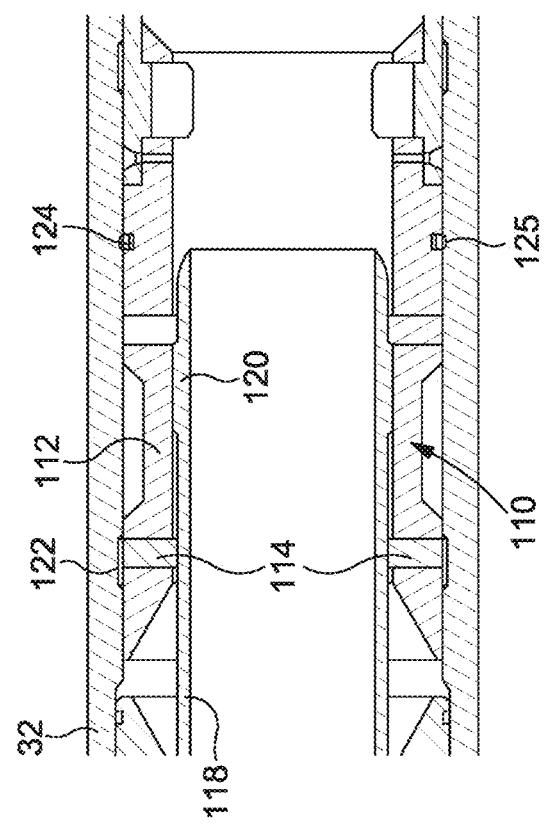
FIG. 8 is an enlarged view of region "8" of FIG. 7.

As shown in FIG. 7, when the valve apparatus 30 is to be operated from its initial closed configuration an operator tool 118, such as a stinger, is run into the valve apparatus 30 to engage the force interface 110. Only a portion of the operator tool 118 is illustrated. The operator tool may be deployed on any suitable medium, such as wireline, coiled tubing or the like. Furthermore, the operator tool 118 may form part of a secondary tool or system, some examples of which will be described later. FIG. 8 provides an enlarged view of region "8" of FIG. 7, illustrating the operator tool 118 in initial engagement with the force interface 110.

The operator tool 118 includes a circumferentially enlarged region 120, and during initial insertion of the operator tool 118 the enlarged region 120 will engage the first array of dogs 114. When the force interface 110 is initially positioned as illustrated, the first array of dogs 114 are aligned with a first dog recess 122 formed in the housing 32, and as such are radially deflected during passage of the enlarged region 120 of the tool 118, allowing the tool 118 to progress and engage the second array of dogs 116 which are radially constrained by the housing 32. Thus, engagement of the enlarged region 120 with the second array of constrained dogs 116 permits the operator tool 118 to apply an axial force on the force interface 110. A snap-ring 124 mounted on the sleeve 112 of the force interface 110 is received within a first snap-ring recess 125 in the housing 32 to provide a releasable connection therebetween, wherein the snap-ring connection is released upon application of a predetermined force applied by the operator tool 118.

FIG. 9 illustrates the valve apparatus 30 when the operator tool 118 has moved the actuator assembly 48 over a first movement phase from its initial first position, in which the pressure relief arrangement 46 has been opened while the valve member 40 remains closed. In this respect, the first phase of movement of the actuator assembly 48 causes corresponding movement of the valve sleeve 102 of the pressure relief arrangement 46 to align the valve ports 108 of the valve sleeve 102 with the pressure relief ports 100 of the seat sleeve 90, as also is illustrated in FIG. 10, which is an enlarged view of region "10" of FIG. 9. Accordingly, pressure on opposing sides of the closed valve member 40 may be equalised.

FIG. 11 illustrates the relative positioning of the valve member 40 and the second actuator arm 64*b* (the engagement between the first actuator arm 64*a* and the valve member corresponds). The elongate slot 70*b* permits the actuator arm 64*b* (and actuator assembly 48) to move axially in the direction of arrow 109 relative to the valve member 40, such that the first interface pin 72 moves towards, but does not yet engage, the interface rib 62. As such, lost motion is provided between the actuator assembly 48 and the valve member 40, such that the valve member 40 may remain closed during the first movement phase of the actuator assembly 48.

The lost motion between the actuator assembly 48 and the valve member 40 allow the pressure relief arrangement 46 to open before any movement of the valve member occurs. Therefore, the pressure across the valve member is equalised before the valve member moves. This may minimise resistance forces, such as frictional forces, which may otherwise retard movement of the valve member.

Figure 13:
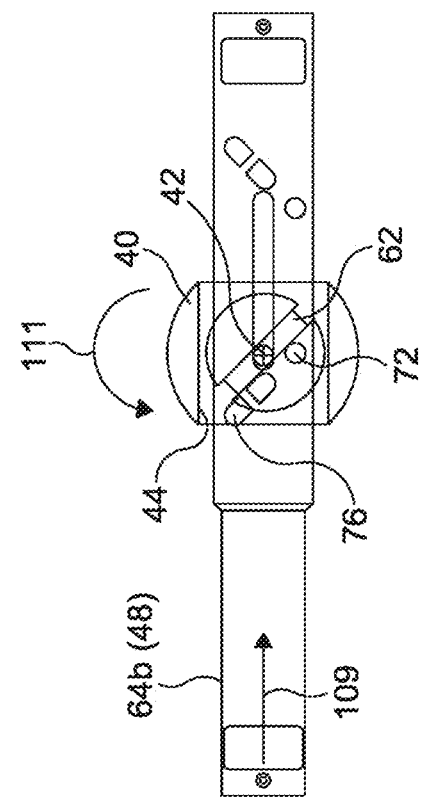
FIG. 13 illustrates the relative positioning between the actuator members and the ball valve member when the valve apparatus is in the open configuration of FIG. 12.

Continued movement of the actuator assembly 48 over a second movement phase to be located in a second position is illustrated in FIG. 12. Such continued movement of the actuator assembly 48 causes the valve member 40 to rotate to its illustrated open position, with the valve member throughbore 44 aligned with the flow path 34. Such rotation of the valve member 40 is achieved by interaction of the first interface pins 72 of the actuator arms 64*a*, 64*b* with the interface ribs 62 of the valve member 40. Such interaction is illustrated in FIG. 13, which illustrates the second actuator arm 64*b* and valve member 40 from below. In this case, during movement of the actuator arm 64*b* (and entire actuator assembly 48) in the direction of arrow 109, the first interface pin 72 will engage an associated interface rib 62 at a location which is laterally offset from the rotation axis 42 of the valve member 40, thus generating a turning moment to rotate the valve member 40 in the direction of arrow 111. When the actuator assembly 48 reaches its illustrated second position the corresponding rotation of the valve member 40 is such that the first rotation stop 76 becomes engaged with the interface rib 62 on an opposing lateral side of the rotation axis 42, thus substantially eliminating any net turning moment, preventing further rotation or over-rotation.

Figure 14:
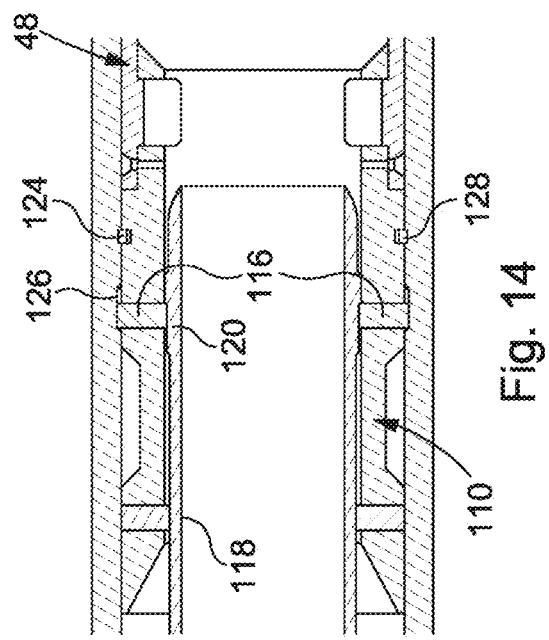
FIG. 14 is an enlarged view of region "14" of FIG. 12.

FIG. 14 provides an enlarged view of region "14" in FIG. 12. When the actuator assembly 48 reaches its second position the force interface 110 is positioned such that the second array of dogs 116 become aligned with a second dog recess 126, allowing the enlarged region 120 of the operator tool 118 to deflect and move past the second array of dogs 116. The snap ring 124 carried by the force interface 110 becomes received with a second snap-ring recess 128, thus establishing a releasable connection between the actuator assembly 48 and the housing 32 with the actuator assembly 48 at its second position. The operator tool 118 may continue to travel past the force interface 110 and, if operations require, through the opened valve member 40 as illustrated in FIG. 15.

The valve apparatus 30 may be subsequently closed. In the present example such closure is achieved by retrieval of the operator tool 118, as illustrated in FIG. 16. FIG. 17 provides an enlarged view in region "17" of FIG. 16. In this case the enlarged region 120 of the operator tool has moved past the second array of dogs 116, by deflecting the dogs 116 into the recess 126, to engage the first array of dogs 114 which are in a position to be radially constrained by the housing 32, such that the operator tool 118 may apply an upwardly directly axial force on the force interface 110, and thus on the entire actuator assembly 48, causing this actuator assembly 48 to move from its second position towards its first position. Over the course of complete movement and return of the actuator assembly 48 to its first position the pressure relief arrangement and the valve member will be sequentially closed.

FIG. 18 illustrates the interaction between the second actuator arm 64b of the actuator assembly 48 and the valve member 40, during this closing operation. In this case movement of the actuator arm 64b (and actuator assembly 48) in the direction of arrow 113 causes the second interface pin 74 to be brought in engagement with the interface rib 62 on the valve member 40, with further movement causing the valve member 40 to be rotated towards its closed position, as illustrated in FIGS. 1 and 5, with the second rotation stop 78 eventually becoming engaged with the interface rib 62 to prevent over-rotation of the valve member 40.

In the example described above, the valve member 40 includes rotary axis pins 60 (see, for example, FIG. 2) which facilitate rotational mounting of the valve member 40 relative to the first and second actuator arms 64a, 64b. However, in other examples such rotary axis pins may not be required, with the valve member 40 being rotatably supported by at least the valve seat 94 and optionally also the guide sleeve 80. The omission of such rotary axis ins may permit a larger effective ball valve member to be utilised, which may maximise the dimension of the valve member through bore.

A perspective view of a modified ball valve member 140 in accordance with such a modification is illustrated in FIG. 19, wherein the valve member 140 is similar to the valve member 40 of the previous example and as such like features share like reference numerals, incremented by 100. Thus, the valve member 140 is generally spherical and is rotatable about a rotation axis 142, with the valve member 140 defining a throughbore 144. The valve member 140 includes opposing interface structures 159 (only one visible in FIG. 19) which each includes an interface rib 162 extending laterally through the rotation axis 142, and obliquely aligned relative to the throughbore 144. Thus, the interface structures 159 do not include any rotary axis pins or equivalent structures.

A perspective view of first and second actuator arms 164a, 164b suitable for use with the modified ball valve member 140 is provided in FIG. 20, wherein the actuator arms 164a, 164b are similar in most respects to arms 64a, 64b, and as such like features share like reference numerals, incremented by 100. Accordingly, each actuator arm 164a, 164b includes structural features which are configured to engage the interface ribs 162 of the valve member 140 (see FIG. 19) to cause rotation of the valve member 140.

Such structural features are only visible on the second actuator arm 164b, although it should be noted that these structural features are replicated (in mirror image) on the first actuator arm 164a. The structural features include a first valve interface in the form of a first drive pin 172 and a second valve interface in the form of a second drive pin 174 which is axially spaced form the first drive pin 172. A first rotation stop 176 is positioned adjacent the first drive pin 172, and similarly a second rotation stop 178 is positioned adjacent the second drive pin 174. In the present example the actuator arms 164a, 164b do not require any elongate slots to accommodate rotary axis pins. The first and second actuator arms 164a, 164b are shown assembled with the valve member 140 in FIG. 21, with the valve member 140 mounted between the actuator arms 164a, 164b. FIG. 21 illustrates the valve member 140 in its closed position (i.e., the throughbore 144 is in a transverse orientation). The operation and interaction of the actuator arms 164a, 164b and the valve member 140 is similar to that described above and as such no further description will be given.

Further examples of valve apparatuses are shown in FIGS. 22A-F and 23A-F.

The example shown in FIGS. 22A-F shares some similarities with the first described example. As such, the reference numerals of FIGS. 22A-F are the same, but augmented by 400.

As with the example shown in FIG. 1, FIGS. 22A-F show a longitudinal cross-sectional view of a ball valve apparatus 430. The ball valve apparatus 430 is intended for use within a wellbore, and as such may be defined as a downhole ball valve apparatus. FIGS. 22A-F show the steps of operation of the ball valve apparatus 430.

Similar to the previous example, the ball valve apparatus 430 comprises a housing 432 in which a ball valve member 440 is mounted within flow path 434. The ball valve 440 is rotatable about a rotation axis 442 from a closed position, as illustrated in FIG. 22A to an open position as shown, for example, in FIG. 22D.

Pressure relief arrangement 446 is operable between open and closed configurations to permit pressure communication on opposing sides of the valve member 440 when the valve member 440 is closed, to facilitate pressure equalisation, as is also the case in the previous example.

The apparatus 430 further includes an actuator assembly 448, comprising actuator arms 464a, 464b, which are axially moveable relative to the housing 432 between first and second positions to sequentially open the pressure relief arrangement 446. The apparatus 430 also includes a force interface 510, which is rigidly connected to the first and second actuator arms 464a, 464b of the actuator assembly 448.

In the example of FIGS. 22A-F, the force interface 510 comprises a radial array of auxiliary fluid ports 530, while the housing comprises an auxiliary port 532 into which an auxiliary conduit 534 is inserted. Auxiliary conduit 534 may be connected to a tool, such as a packer (not shown), and the tool may be operated as a result of fluid communication via the auxiliary conduit 534.

In the position shown in FIG. 22A, a sealing sleeve 538 is positioned between the force interface 510 and the auxiliary fluid port 532. The sealing sleeve comprises a seal or seal arrangement that encompasses the fluid port 532, preventing fluid communication between the fluid port 532 and the flow path 434 of the apparatus 430. The sealing sleeve 538 is held in place by shear pin 540.

As with the previous example, the valve apparatus 430 may be operated from its initial closed configuration by an operator tool 518, such as a stinger, which may be run into the valve apparatus 430 to engage the force interface 510.

Referring now to FIG. 22B, the operator tool 518 has engaged the force interface 510, as described in FIG. 8, and moved the force interface 510 axially within the valve apparatus 430. As the force interface 510 moves, it abuts the sealing sleeve 538 and causes shearing of the shear pin 540, forcing the sealing sleeve to move axially with the force interface 510. In doing so, the seal or sealing arrangement of the sealing sleeve 538 no longer encompasses the fluid port 532, and in FIG. 22B, fluid communication between the flow path 434 and the auxiliary conduit 534 is possible. In this example, the fluid pressure of the flow path 434 may be higher than that within the auxiliary conduit 534, and cause fluid to be communicated from the flow path 434 via the conduit 534 to a tool, which may cause actuation of the tool. The auxiliary conduit 534 may be connected to an actuatable tool such as a packer or valve, may be connected to a further conduit or part of the wellbore, or the like.

FIG. 22C illustrates the force interface 510 having been moved axially further through the tool to further align the array of auxiliary ports 530 in the force interface 510 and the auxiliary port 532 in the housing 432. As in the previous example, movement of the force interface 510 has effected movement of the actuator assembly 448 and rigidly attached pressure relief arrangement 446 such that equalisation of the pressure on either side of the valve 440 is permitted (i.e. such that the valve ports 508 of valve sleeve 502 align with pressure relief ports 500 of seat sleeve 490, as shown in FIG. 9).

In FIG. 22D, the operator tool 518 continues to move the force interface 510 axially along the valve apparatus 430 such that the actuator assembly 448 to cause the valve member 440 to open, as described previously with reference to FIG. 12.

Shown in FIGS. 22E and 22F, the operator tool 518 reverses direction, and returns towards its original position shown in FIG. 22A, thereby also returning the force interface 510 and the actuator assembly 448 towards their original positions. As the shear pin 540 of the sealing sleeve 538 has been sheared, the sealing sleeve 538 does not return fully to its original position and fluid communication between the flow path 434 and the auxiliary fluid port 532 remains possible.

Although, in this example, the valve apparatus 430 comprises a pressure relief arrangement 446 in combination with an auxiliary port 532 and auxiliary conduit 534 arrangement, there may be embodiments wherein a pressure relief arrangement 446 is not required. In such embodiments, the auxiliary port 532 and auxiliary conduit 534 arrangement may be used to control a tool independently of the functioning of any pressure relief arrangement 446.

A further example is illustrated in FIGS. 23A-F. This example shares some similarities with the first example. As such, the reference numerals are the same, but augmented by 600.

As with FIGS. 22A-F, FIGS. 23A-F illustrate a longitudinal cross-sectional view of a ball valve apparatus 630. This example comprises vastly similar components to that of FIGS. 22A-F with the exception that, in this example, there is no sealing sleeve mounted on force interface 710. Rather, seal or seal arrangement 738 is mounted directly on the force interface 710. The same steps of operation are shown as in FIGS. 22A-F.

In this configuration, the steps taken to open the valve (shown in FIGS. 23A to 23D) member 640 are substantially similar to the previous example. That is, prior to opening of the valve member, movement of the force interface 710 by the operator tool 718 first initiates fluid communication between the flow path 634 and the auxiliary port 732, and then allows pressure equalisation of the flow path 634 on either side of the valve member 640 via the pressure relief arrangement 646 before opening the valve member 640 from the closed configuration.

Upon closing the valve member 640, the force interface 710 is moved towards its original position. In this example, as the seal or seal arrangement 738 is directly mounted on the force interface 710, once the force interface 710 is returned to its original position, the seal or seal arrangement 738 is also returned to its original position and once again seals around auxiliary fluid port 732 to prevent fluid communication between the flow path 634 and the auxiliary fluid port 732.

The valve apparatus 30 described herein may have multiple possible uses and applications, some examples of which will now be described with reference to FIGS. 23 and 24.

FIGS. 24A to 24C diagrammatically illustrate the sequential operation of the valve apparatus 30 in a first example application. In this case the valve apparatus 30 is provided in combination with a packer 200 which is illustrated in FIG. 24A set in a wellbore 202 with the valve member 40 in a closed position, thus providing isolation between a lower zone 204 of the wellbore 202 from an upper zone 206. FIG. 24A illustrates a string assembly 208 being deployed downhole towards the packer 200, wherein the string assembly 208 includes an operator tool in the form of a stinger 118.

FIG. 24B illustrates the stinger 118 stabbed into the valve apparatus 30, which has reconfigured the valve member 40 to its open position in the manner described above. Accordingly, fluid communication is established between the lower zone 204 and the string assembly 208. In the example illustrated flow is permitted from the lower zone 204 and into the string assembly 208, as illustrated by arrows 210, for example to accommodate production operations. However, in alternative examples flow may be established in a reverse direction, from the string assembly 208 and into the lower zone 204, for example to accommodate injection operations. In the illustrated example the stinger 118 extends through the valve member 40, thus providing a degree of protection to said valve member 40 during flow therethrough.

FIG. 24C illustrates retrieval of the string assembly 208, wherein the valve member 40 is operated to return to its closed position during extraction of the stinger 118, in the manner described above.

In some examples the string assembly may comprise pump, such as an Electric Submersible Pump (ESP).

FIGS. 25A to 25D diagrammatically illustrate the sequential operation of the valve apparatus 30 in a second example application. In this case the valve apparatus 30 is provided at an upper end of a liner assembly 300 which is deployed on a running string 302 through an upper wellbore section 304 (which may be cased 306) and into a lower wellbore section 308 (which may be an open hole bore 310). The liner assembly 300 may be of conventional form, and may include features such as screens 312, perforations, gravel packs and the like. The running string 302 includes a stinger 118 which is initially inserted into the valve apparatus 30 to position the valve member 40 in its open configuration. Accordingly, the valve apparatus 30 is deployed while open, which may provide operational benefits during installation of the liner assembly 300, such as to permit fluid circulation through the liner assembly 300 or the like.

Figure 23A:
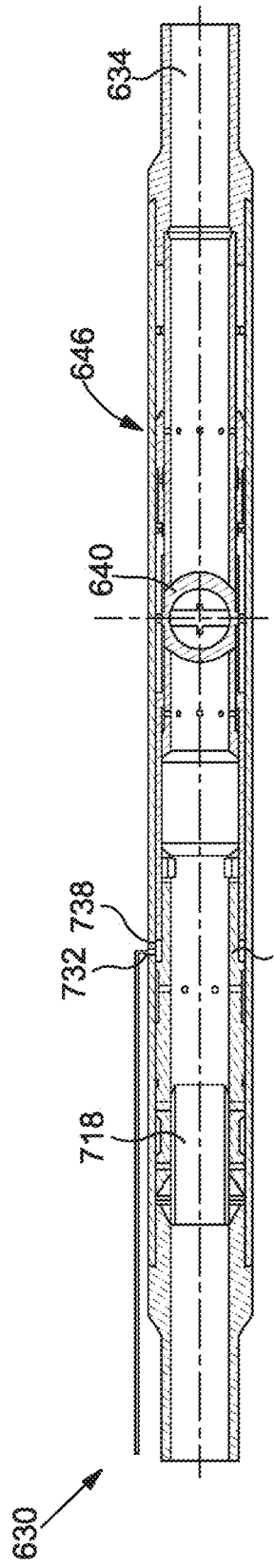
Figure 23B:
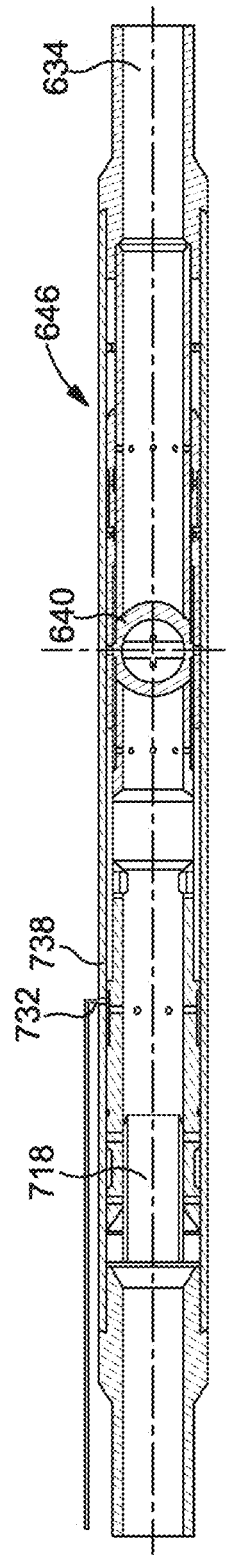
Figure 23C:
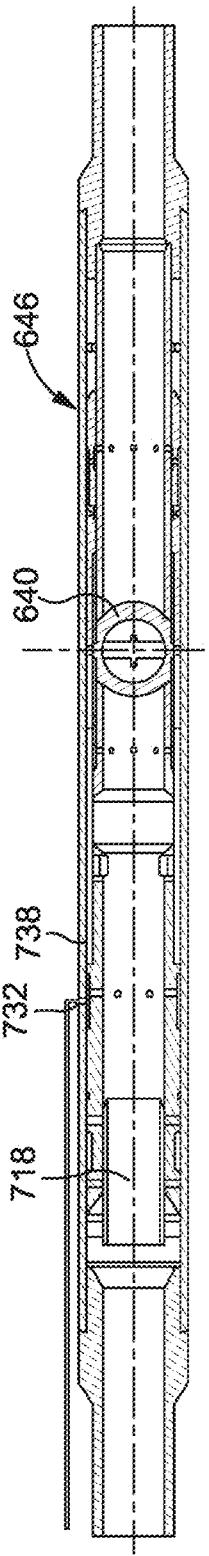

Once the liner assembly 300 is installed and appropriately secured via infrastructure such as a liner hanger 314, the running string 302 may be retrieved, as illustrated in FIG. 23B, with removal of the stinger 118 causing the valve member 40 to close. Such an arrangement may provide isolation between the upper and lower wellbore sections 304, 308. An upper completion 316 may then be installed in the isolated upper wellbore section 304, as illustrated in FIG. 25C. Subsequent to this, as illustrated in FIG. 25D a further tool 318, such as a running tool, drop-off sleeve or the like may be deployed to operate the valve apparatus 30 and open the valve member 40.

The examples described above have the advantages and benefits illustrated in FIGS. 26 and 27.

A further example of a valve apparatus is shown in FIGS. 26 and 27, illustrating the pressure barrier. The example shown in FIGS. 26 and 27 shares some similarities with the first described example. As such, the reference numerals of FIGS. 22A-F are the same, but augmented by 800.

Similar to the previous examples, the ball valve apparatus 830 comprises a housing 832 in which a ball valve member 840 is mounted within flow path 834. The ball valve 840 is rotatable from a closed position to an open position as shown. FIGS. 26 and 27 show the ball valve in the closed position.

Pressure relief arrangement 846 is operable between open and closed configurations to permit pressure communication on opposing sides of the valve member 840 when the valve member 840 is closed, to facilitate pressure equalisation, as is also the case in the previous examples. FIGS. 26 and 27 show the pressure relief arrangement 846 in the closed configuration.

The pressure relief arrangement 846 includes a valve sleeve 902. The valve sleeve 902 is rigidly connected to a seal carrier 930. The seal carrier 930 includes a pair of axially separated seals 904, 906 which axially straddle and thus seal the pressure relief ports 900 when the pressure relief arrangement 846 is in its illustrated closed configuration. When the valve member 840 and the pressure relief arrangement 846 are both in their respective closed configurations, a pressure barrier is formed around the flow path 834a below the valve member 840, as shown in FIGS. 26 and 27. The pressure barrier is sealed by valve seat 894 and the seals 904, 906 of the pressure relief arrangement 846.

FIG. 26 shows pressure below the valve member 840. The pressure is retained within the flow path 834a below the valve member 840. The pressure barrier is distal from the components of the apparatus that are above the valve member 840, therefore the risk of damage to the apparatus above the valve member 840 is minimised.

Furthermore, providing the pressure barrier below the valve member 840 maximises the space available the components of the apparatus above and around the valve member 840. Also, the space available for the valve member 840 itself is maximised such that the size of the valve member through bore can be maximised. This has benefits of allowing larger tools to be passed through the valve member 840 when the valve member 840 is in its open configuration.

FIG. 27 shows pressure above the valve member 840. The flow path 834b above the valve member 840 is in communication with the annular space 892 via ports 932 in the guide sleeve 880. Pressure is retained in a horseshoe around the flow path 834a below the valve member 840. Pressure extends below the valve member 840 within the annular space 892 as far as the dynamic seal 896.

The seals 904, 906 are axially spaced either side of the pressure relief ports 900, therefore pressure acting on each seal 904, 906 acts in respective axially opposing directions. The seals 904, 906 are the same size, therefore the same magnitude of pressure is applied to each seal 904, 906. The axially opposing seals 904, 906 provide an axial pressure balance and the pressure relief arrangement 846 is axially pressure balanced. This eases movement of the pressure relief arrangement 846, and therefore the actuator assembly, because the pressure differential to be overcome is minimised.

Furthermore, due to the lost motion across the valve member 840 allowing the actuator assembly to move the pressure relief arrangement 846 without any axial movement of the valve member 840, the actuator assembly does not have to overcome the resistant force of the pressure barrier on the valve member 840 to move the pressure relief arrangement 846. Accordingly, the actuator assembly can be moved more easily.

Various examples of a valve apparatus and methods of use, and methods of controlling flow along a flow path, such as in a wellbore, have been provided. However, further examples are possible.

The invention claimed is:

1. A downhole valve apparatus, comprising:
a housing having a flow path therein;
a valve member mounted within the housing and being configured to operate between closed and open configurations to control flow along the flow path;
a pressure relief arrangement configured to operate between closed and open configurations to selectively permit pressure communication on opposing sides of the valve member when said valve member is in its closed configuration;
an actuator assembly configured to move from a first position to a second position to sequentially open the pressure relief arrangement and the valve member from their respective closed configurations, such that the pressure relief arrangement is opened before the valve member;
wherein the pressure relief arrangement comprises a pressure relief port arranged in communication with one side of the valve member, and a pressure relief valve member configured to operate by the actuator assembly to open the pressure relief port, wherein the pressure relief valve member comprises a sealing arrangement configured to seal the pressure relief port, wherein the sealing arrangement comprises a pair of axially spaced sealing members, wherein when the pressure relief arrangement is in its closed configuration the sealing members are positioned on opposing axial sides of the pressure relief port, and wherein the sealing members are sized such that when the pressure relief arrangement is in its closed configuration axially opposing pressure on the sealing members is balanced;
wherein the actuator assembly extends from the one side of the valve member to engage the pressure relief arrangement on an opposing axial side of the valve member; and
wherein the pressure relief arrangement comprises a bypass flow path at least partially defined between a seat sleeve and the housing such that when the pressure relief arrangement is configured in its open configuration the bypass flow path is configured to provide pressure communication between opposing sides of the valve member.

2. The valve apparatus according to claim 1, wherein the actuator assembly is configured to axially move the pressure relief arrangement to its open configuration before moving the valve member.

3. The valve apparatus according to claim 1, wherein the actuator assembly is configured to move from its second position to its first position to sequentially close the pressure relief arrangement and the valve member.

4. The valve apparatus according to claim 1, wherein the valve member comprises a rotary valve member which is configured to rotate about a rotation axis to move between its closed and open positions.

5. The valve apparatus according to claim 1, comprising a valve seat configured to cooperate with the valve member, wherein the sealing arrangement is defined between the valve seat and the valve member for providing a sealed barrier within the flow path when the valve member is in its closed configuration.

6. The valve apparatus according to claim 5, comprising a seat sleeve, wherein the valve seat is provided on one end of the seat sleeve, the seat sleeve defining a flow path therethrough, said flow path of the seat sleeve defining a portion of the flow path of the housing.

7. The valve apparatus according to claim 6, wherein the seat sleeve is configured to move while mounted within the housing.

8. The valve apparatus according to claim 6, wherein the seat sleeve is sealed relative to the housing with a sleeve seal arrangement.

9. The valve apparatus according to claim 6, wherein the seat sleeve defines an annular space with the housing.

10. The valve apparatus according to claim 1, wherein the pressure relief arrangement comprises the pressure relief valve member configured to operate by the actuator assembly within the bypass flow path between closed and open configurations.

11. The valve apparatus according to claim 10, wherein the pressure relief valve member is configured to move axially by the actuator assembly.

12. The valve apparatus according to claim 1, wherein the actuator assembly comprises a linear actuator assembly.

13. The valve apparatus according to claim 12, wherein the linear actuator assembly is configured to rotate the valve member and linearly operate the pressure relief arrangement.

14. The valve apparatus according to claim 1, wherein the actuator assembly is rigidly engaged with the pressure relief arrangement such that the actuator assembly is configured to provide corresponding and simultaneous movement of both the actuator assembly and the pressure relief arrangement.

15. The valve apparatus according to claim 1, wherein a lost motion arrangement is defined between the actuator assembly and the valve member such that the actuator assembly is configured to move in a first movement phase over a first distance from its first position and partially towards its second position without corresponding operation of the valve member, and move in a second movement phase over a second distance to its second position while operating the valve member to open.

16. The valve apparatus according to claim 15, wherein the first and second movement phases are configured to be sequential and continuous, and the first and second distances collectively define a total movement distance of the actuator assembly from its first to second positions.

17. The valve apparatus according to claim 1, wherein the actuator assembly includes an actuator member which comprises an intermediate portion having a valve member interface configured to engage and drive the valve member towards its open configuration during movement of the actuator assembly towards its second position.

18. The valve apparatus according to claim 17, wherein the valve member interface is axially separated from engagement with the valve member when the actuator assembly is in its first position.

19. The valve apparatus according to claim 17, wherein the valve member interface engages the valve member at a location which is laterally offset from a rotation axis of the valve member to permit the valve member to be rotated during movement of the actuator assembly.

20. The valve apparatus according to claim 17, wherein the valve member interface is configured to engage the valve member after the actuator assembly has moved the pressure relief arrangement to its open configuration.

21. The valve apparatus according to claim 17, wherein the valve member interface is configured to move axially.

22. The valve apparatus according to claim 17, wherein the valve member comprises a follower interface configured to engage the valve member interface of the actuator assembly, wherein the valve member interface is configured to act on the follower interface during movement of the actuator assembly towards its second position to move the valve member towards its open configuration.

23. The valve apparatus according to claim 22, wherein the follower interface comprises a rib having at least one portion which is laterally offset from a rotation axis of the valve member.

24. The valve apparatus according to claim 23, wherein the rib extends laterally through the rotation axis of the valve member.

25. The valve apparatus according to claim 17, wherein the valve member interface comprises a rotation stop configured to prevent over rotation of the valve member.

26. The valve apparatus according to claim 17, wherein the actuator assembly comprises a first valve member interface configured to engage the valve member to open the valve member when the actuator assembly is moved in a first direction towards its second position, and a second valve member interface which is axially separated from the first valve member interface and is configured to engage the valve member to close the valve member when the actuator assembly is moved in a second, reverse direction towards its first position.

27. The valve apparatus according to claim 26, wherein the axial spacing between the first and second valve member interfaces defines a lost motion between the actuator assembly and the valve member in reverse directions of operations.

* * * * *